(12) United States Patent
Lang et al.

(10) Patent No.: US 7,591,099 B2
(45) Date of Patent: *Sep. 22, 2009

(54) BED BUG MONITOR

(75) Inventors: Jason Gregory Lang, Bloomington, MN (US); Joelle Francine Olson, Shoreview, MN (US); Stephen John Barcay, Burnsville, MN (US); Stephen X. Skaff, Apple Valley, MN (US)

(73) Assignee: Ecolab Inc., St. Paul, MN (US)

( * ) Notice: Subject to any disclaimer, the term of this patent is extended or adjusted under 35 U.S.C. 154(b) by 7 days.

This patent is subject to a terminal disclaimer.

(21) Appl. No.: 11/511,851

(22) Filed: Aug. 28, 2006

(65) Prior Publication Data

US 2007/0044372 A1    Mar. 1, 2007

Related U.S. Application Data

(60) Provisional application No. 60/712,340, filed on Aug. 30, 2005.

(51) Int. Cl.
A01M 1/00 (2006.01)
(52) U.S. Cl. ....................................... 43/107
(58) Field of Classification Search .................. 43/107
See application file for complete search history.

(56) References Cited

U.S. PATENT DOCUMENTS

| | | | |
|---|---|---|---|
| 3,304,646 | A | 2/1967 | Staley |
| 3,708,908 | A | 1/1973 | Levey |
| 3,816,956 | A | 6/1974 | Sekula |
| 4,031,654 | A | 6/1977 | Gray |
| 4,395,842 | A | 8/1983 | Margulies |
| 4,998,376 | A | 3/1991 | Scherabak |
| 5,042,194 | A | 8/1991 | Cohen |
| 5,090,153 | A | 2/1992 | Mullen et al. |
| 5,119,586 | A | 6/1992 | Townsend |
| 5,253,450 | A | 10/1993 | Muramatsu |
| 5,258,176 | A | 11/1993 | Keenan |
| 5,271,354 | A | 12/1993 | Barnett |

(Continued)

FOREIGN PATENT DOCUMENTS

EP    1 467 619 B1    8/2005

(Continued)

OTHER PUBLICATIONS

Aboul-Nasr, A. et al., "Behaviour and sensory physiology of the bed-bug, Cimex lectularius L., to some environmental factors: Chemoreception," Bull. Soc. ent, Egypte, vol. LII, pp. 353-362 (1968).

(Continued)

Primary Examiner—Kurt Rowan
(74) Attorney, Agent, or Firm—Andrew D. Sorensen; Anneeliese S. Mayer; Amy J. Hoffman

(57) ABSTRACT

An insect monitoring and trapping device is provided according to the invention. The device includes a base and a lid for covering the base, and is constructed to provide a trap interior and an insect opening for insects to access the trap interior. The device includes a heating device provided within the trap interior for attracting insects, and an adhesive surface provided within the trap for trapping insects.

15 Claims, 18 Drawing Sheets

U.S. PATENT DOCUMENTS

| | | |
|---|---|---|
| 5,665,370 A | 9/1997 | Gehret et al. |
| 5,713,153 A | 2/1998 | Cook et al. |
| 5,771,628 A | 6/1998 | Nobbs |
| 5,987,810 A | 11/1999 | Nash |
| 6,594,947 B2 | 7/2003 | Lingren et al. |
| 6,625,922 B1 | 9/2003 | Ernsberger, IV |
| 6,792,395 B2 | 9/2004 | Roberts .................. 702/188 |
| 7,069,188 B2 | 6/2006 | Roberts .................. 702/188 |
| 2003/0070347 A1 | 4/2003 | Lingren et al. |
| 2003/0127108 A1 | 7/2003 | Policicchio et al. |
| 2003/0184442 A1 | 10/2003 | Gardner et al. |
| 2003/0208952 A1 | 11/2003 | Dible |
| 2003/0233784 A1 | 12/2003 | Feldhege et al. |
| 2005/0091911 A1 | 5/2005 | Matts et al. |

FOREIGN PATENT DOCUMENTS

| | | |
|---|---|---|
| GB | 1 368 450 | 9/1974 |
| GB | 1 398 227 | 6/1975 |
| GB | 2 262 889 A | 7/1993 |
| JP | 07 123894 | 5/1995 |

OTHER PUBLICATIONS

Aboul-Nasr, A. et al., "The effect of contact and gravity reactions upon the bed-bug, *Cimex lectularius* L.," *Bull. Soc. ent, Egypte*, vol. LII, pp. 363-370 (1968).

Mellanby, K., "The physiology and activity of the bed-bug (*Cimex lectularius L.*) in a natrual infestation," *Parasitology*, vol. XXXI, pp. 200-211 (1939).

Potter, M., "Bed Bugs," *University of Kentucky Entomology*, http://www.uky.edu/Agriculture/Entomology/entfacts/struct/ef636.htm, 7 pages (Jun. 2004).

FIG.5
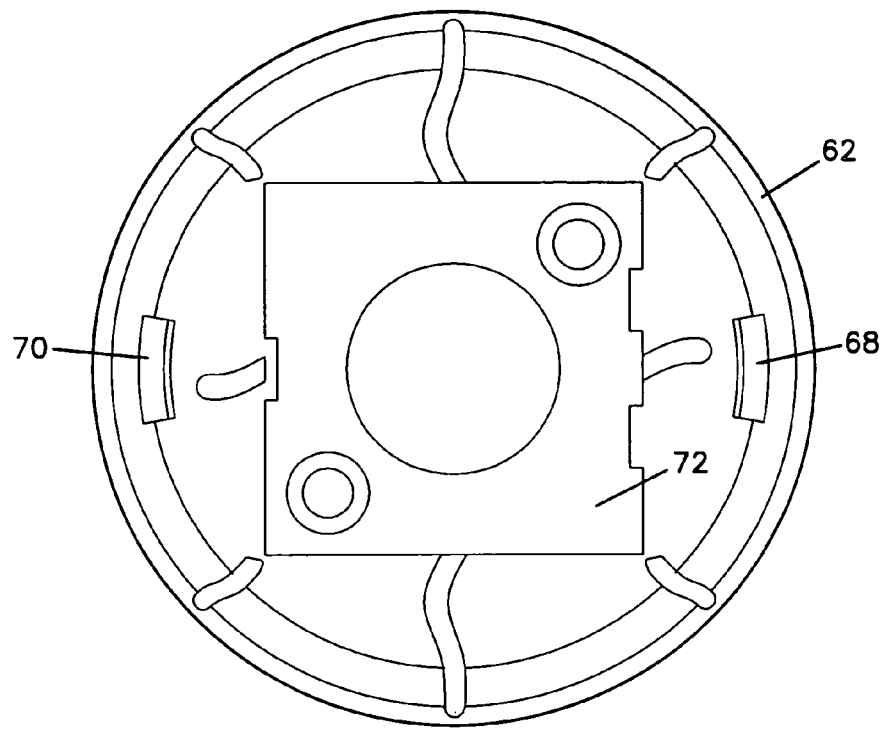
FIG.6
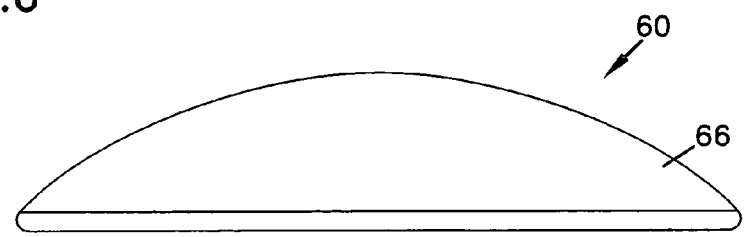
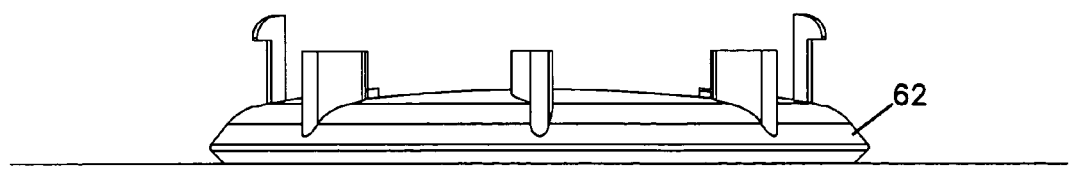

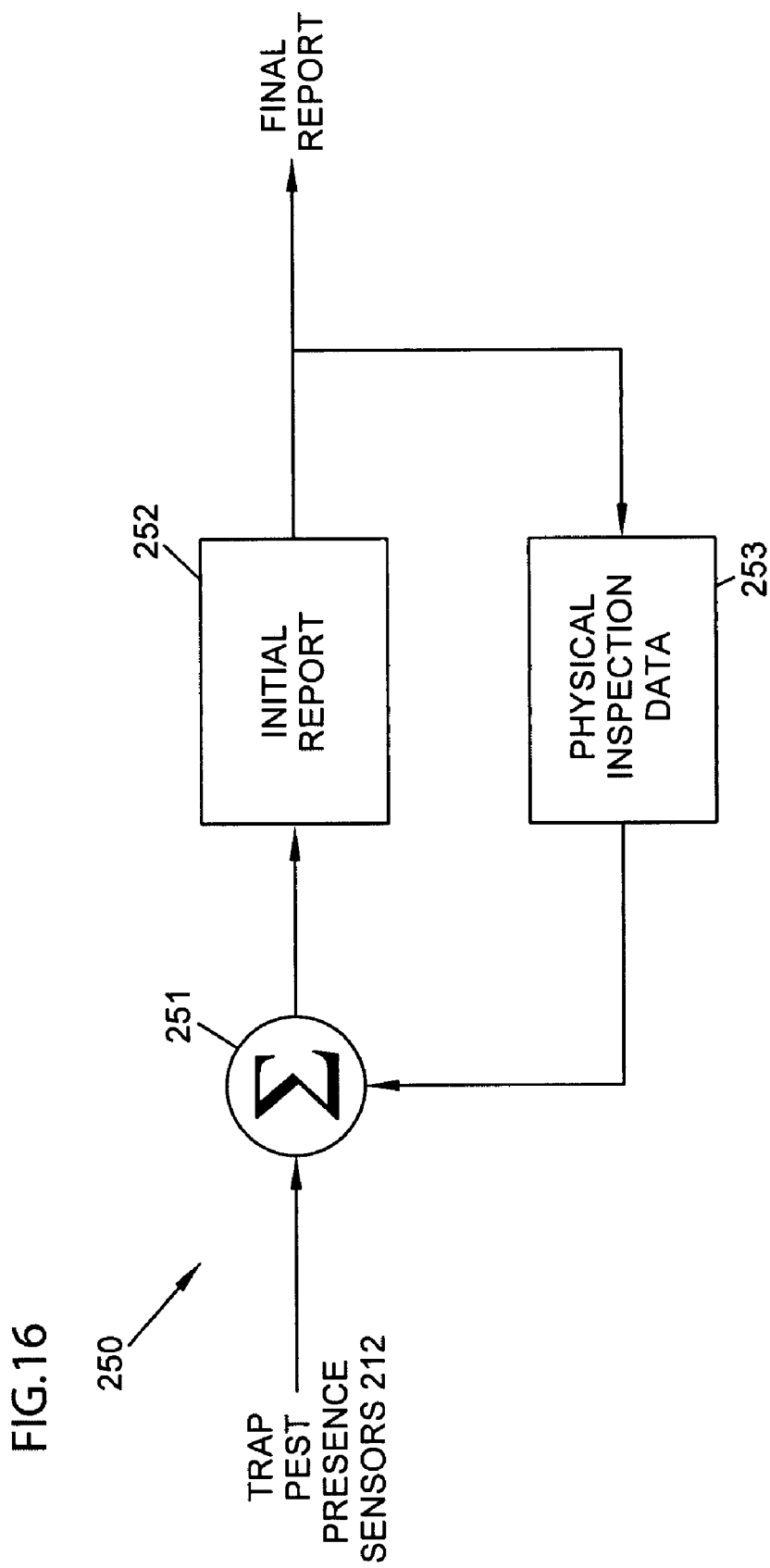

BED BUG MONITOR

This application claims priority to Provisional Patent Application Ser. No. 60/712,340 that was filed with the United States Patent and Trademark Office on Aug. 30, 2005. The entire disclosure of Provisional Application Ser. No. 60/712,340 is incorporated herein by reference.

FIELD OF THE INVENTION

The invention relates to an insect monitoring and trapping device. The device is particularly suited for monitoring and trapping bed bugs.

BACKGROUND OF THE INVENTION

Bed bugs are small insects that feed solely on the blood of animals. The common bed bug, Cimex Lectularus, is the species of bed bug that has most adapted to living with humans. Bed bugs have lived with humans since ancient times, although many people living in the United States have never seen a bed bug. However, the increase of international travel in recent decades has contributed to the resurgence of bed bugs in the United States. There are many aspects of bed bugs that make it difficult to eradicate them once they have established a presence in a location.

Adult bed bugs are about ¼ inch or about 6 millimeters long, 5-6 millimeters wide, and reddish-brown with oval, flattened bodies. The immature nymphs are similar in appearance to the adults but smaller and lighter in color. Bed bugs do not fly, but they can move very quickly over surfaces. Female bed bugs lay their eggs in secluded areas and can deposit up to five eggs per day, and as many as 500 during a lifetime. The bed bug eggs are very small, about the size of a dust spec. When first laid, the eggs are sticky causing them to adhere to surfaces.

Bed bugs can go long periods of time without feeding. Nymphs can survive months without feeding and the adults for more than a year. Infestations are therefore not likely to be eliminated by leaving a location unoccupied.

Bed bugs are active during the nighttime and primarily hide during the daytime into tiny crevices or cracks. Bed bugs may find easy hiding places in beds, bed frames, furniture, along baseboards, in carpeting, and countless other places. Bed bugs tend to congregate but do not build nests like some other insects.

Bed bugs obtain their sustenance by drawing blood through an elongated beak. They may feed on a human for 3 to 10 minutes although the person is not likely to feel the bite. After the bite, the victim often experiences an itchy welt or swelling in the area of the bite. However, some people do not have any reaction or only a very small reaction to a bed bug bite. Bed bug bites have symptoms that are similar to other insect bites, such as mosquitoes and ticks. It is not possible to determine whether the bite is from a bed bug or another type of insect without actually observing the bed bug. As a result, bed bug infestations may go long periods without being detected.

Bed bug infestations originate by a bed bug being carried into a new area. Bed bugs are able to cling to possessions and hide in small spaces so that they may easily be transported in a traveler's belongings. As a result, buildings where turnover of occupants is high, such as hotels or apartments, are especially vulnerable to bed bug infestations.

Because of all the features of bed bugs described herein, bed bugs are difficult to eradicate. Professional pest removal specialists and pesticides are needed. It is necessary to remove all clutter and unnecessary objects from a room, remove bed bugs and eggs as much as possible through vacuuming, and apply pesticides to likely hiding areas. This type of treatment for eradication can be disruptive to a business such as a hotel. As a result, it is very desirable to detect bed bugs at the earliest possible moment before an infestation becomes established.

The tiny, mobile and secretive behavior of bed bugs makes it nearly impossible to prevent an infestation. However, the earliest possible detection can make it possible to eradicate the insects most easily. Devices and methods for the early detection of bed bugs are needed especially by those in the hospitality industries.

SUMMARY

An insect monitoring and trapping device is provided according to the invention. The device includes a corrugated layer for a first glueboard. The corrugated layer forms alternating ridges and grooves. The first glueboard is attached to the ridges of the corrugated layer, and is configured to immobilize insects.

An alternative embodiment of an insect monitoring and trapping device is provided according to the invention. The device includes a base and a lid for covering the base, and is constructed to provide a trap interior and an insect opening for insects to access the trap interior. The device includes a heating device provided within the trap interior for attracting insects, and an adhesive surface provided within the trap for trapping insects.

BRIEF DESCRIPTION OF THE DRAWINGS

FIG. 5 is a top view of the base of the bed bug monitor of FIG. 3.

FIG. 6 is a view of the lid of the bed bug monitor of FIG. 3.

FIG. 16 is a schematic diagram of the report generation process of the system of FIG. 15.

DETAILED DESCRIPTION OF THE PREFERRED EMBODIMENT

Figure 1:
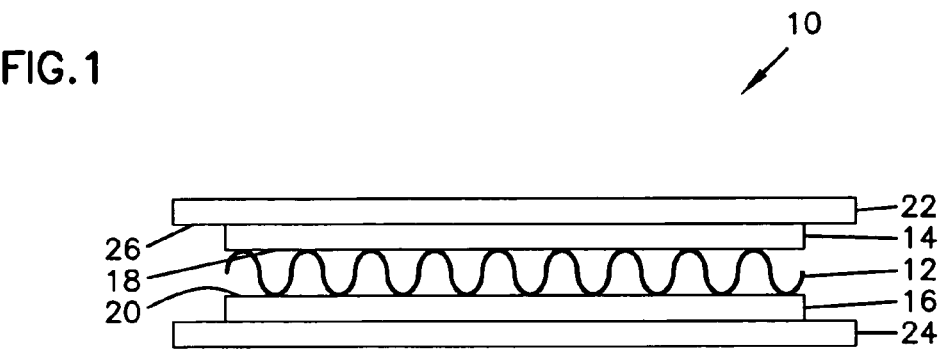
FIG. 1 is a side view of a bed bug monitor according to a first embodiment of the present invention.

The present invention serves to detect bed bugs in a location at the earliest possible time after their arrival, so that early extermination efforts may be undertaken. In the hospitality industry, even one encounter by a customer or member of the public with a bed bug leads to a low level of customer satisfaction and the possibility of a negative reputation in the community. The early monitoring and detection of bed bugs can help to reduce the possibilities of these negative effects.

The present invention is a bed bug monitor that attracts bed bugs, and retains the bed bugs or records their passage through the trap.

A bed bug monitor of the present invention can include two basic aspects: an attractant and a retention or recording mechanism detection, and placement. In designing a monitor, it is also important to consider how the presence of bed bugs in the monitor will be detected and where the monitor will be placed. Each of these aspects of a bed bug monitor will be discussed in detail with examples provided for how the goals of each component will be accomplished.

Attractant Mechanisms

An attractant mechanism is desirable for use in a bed bug monitor because it increases the likelihood that a bed bug will encounter the monitor. This in turn increases the probability of early detection of a bed bug infestation.

Pheromone

One example of an attractant is an aggregation or arrestant pheromone. A pheromone may be in gel form, in solid form, or impregnated into another materials. Examples of materials into which a pheromone may be impregnated may include cardboard, plastic, or an adhesive board. A pheromone may also be incorporated into an absorbent pad.

Suitable woven and nonwoven materials for an absorbent pad include natural fibers (e.g., wood or cotton fibers), synthetic fibers such as polyolefins (e.g., polyethylene and polypropylene), polyesters, polyamides, and synthetic cellulosics (e.g., RAYON™ material), or from a combination of natural and synthetic fibers. Such synthetic fibers can be manufactured using known processes such as carded, spunbond, meltblown, airlaid, needle punched and the like. For example, the absorbent material may include cotton batting, fiberized cellulose wood pulp, synthetic batting, polyester batting, felt, bonded carded webs, high loft spunbond materials, and commingled cellulose wood pulp and polypropylene materials. Some examples of acceptable absorbent materials are described in Published U.S. Patent Application US-20030127108, which is hereby incorporated by reference.

In one alternative, the pad may include both an absorbent material and a cover including materials like spunbonded nonwoven material, apertured formed thermoplastic film, hydroformed thermoplastic film, porous foams and thermoplastic scrims.

One benefit of using a cover is that it may allow a liquid chemical attractant, such as a pheromone, pheromone to pass through it and be absorbed into the pad. The active pheromone composition is often suspended in a liquid solvent, which can then be evaporated away using heat or dry air, etc, leaving only the pheromone chemicals. The pheromone chemicals are then embedded within the pad, and protected by the pads cover. This arrangement will reduce the likelihood that when insects walk on the pad, the pheromones are carried away with them. The pheromones stay in the pad extending attraction efficacy.

Any of these pad materials may include a chemical attractant to lure insects to the station. Many different types of chemical attractants are known including food based attractants and pheromones.

Food Attractants

Food type attractants may be used and may be in the form of liquid gel or in a solid form. For bed bugs, food type attractants simulate human odors.

Tactile Cues

Bed bugs are attracted to materials with a rough surface texture and surface porosity. For example, bed bugs are more likely to congregate on wood or cardboard than on smooth plastic material. Examples of materials that may be incorporated into the bed bug monitor to attract the bed bugs include wood, cardboard, corrugated cardboard, cotton, or wallpaper.

Laboratory tests were performed to compare the attractantcy to bed bugs of five materials: a dome trap made of a plastic materials manufactured by Trece Incorporated, a roll of cotton fabric with a paperclip used to hold it flat, a block of wood from a headboard with three holes drilled into it, a stainless steel plate and cardboard. The headboard block attracted significantly more bed bugs than any other material. The cardboard material attracted significantly more bed bugs than the remaining three materials.

One possible reason for the attractants of the bed bugs to the wood and cardboard material could be that their rougher surface makes it easier for the bed bugs to move and have traction on the surface. Another possibility is that materials such as wood are often found near food sources, such as bed frame being in close proximity to a human.

Cardboard may be especially useful as an attractant mechanism in a bed bug monitor because it is lightweight, economical to manufacture, and degrades more easily than wood after disposal. Corrugated cardboard usually consists of two sheets of smooth cardboard liner material sandwiching a fluted cardboard layer. Corrugated cardboard may be especially attractive to bed bugs because it provides both roughness and small crevices in which the bed bugs may insinuate themselves. Because bed bugs are about 5 to 6 millimeters in width, corrugated cardboard with fluting that has a peak-to-peak distance of about 6 to 7 millimeters may be desirable.

Materials with a low heat transfer rate are also desirable for bed bugs and provide an attractant mechanism for the trap.

Vibration is another possible tactile cue that attracts bed bugs. It is possible that blood coursing through the veins of a human creates a vibration sensation that is detectable to bed bugs. As a result, vibration can serve as an attractant mechanism in a bed bug monitor.

Heat is another example of a tactile cue that attracts bed bugs. Heat may be provided in a bed bug monitor in many different ways. Enclosed structures such as capsules that facilitate an acid base reaction may be used to provide heat. For example, calcium hydroxide capsules are commercially available to provide heat upon demand. The heat can be provided as radiant heat or infrared heat.

Humidity is another example of a tactile cue that attracts bed bugs. Humidity may be provided in a bed bug monitor by providing an absorbent pad, such as one of the types described above, with moisture incorporated into the pad.

Olfactory Attractants

Bed bugs may find their food sources by detecting components of breath, perspiration, hair or skin oil. The following components of human breath can serve as an attractant mechanism in a bed bug monitor: carbon dioxide, methanol, methane, Furan, and Pyridine.

The following components of human perspiration can be used as attractant mechanisms in bed bug monitors: lactic acid, butyric acid, octenol, indole, 6-methyl-5-hepten-2-one, geranyl acetone, 1-dodecanol, 3-methyl-1-butanol, carboxylic acids, and urea. Sebum is a component of skin oil that can be used as an attractant.

Retention

An aspect of a bed bug monitor is the ability to retain or trap a bed bug or otherwise record the bed bugs presence. Some examples of detection mechanisms that do not involve retention of the bed bug will be discussed in more detail herein. However, generally the simplest method for determining whether a bed bug has been present at the trap is retaining the bed bug.

A glueboard covered with an adhesive that retains a bed bug on the glueboard may be used. Glue boards are commonly used in the insect control industry and are available from many commercial sources, such as Atlantic Paste and glue in Brooklyn, N.Y. Another example is a reservoir of oil that will trap insects, a gel or other substance that the insects will stick to, a toxicant strip of plastic impregnated with an insecticide, or an insecticide compound such as a dust or in another form.

As mentioned above, passive systems are possible that detect the presence of a bed bug but do not retain the bed bug. For example, a chemical detection mechanism may be used to detect a chemical that is present on the bed bug's body or feces. A surface in the monitor can have a chemical that will change color when such a color is detected. Also, a sophisticated chemical sniffers have also been developed that can detect the presence of certain chemicals in the air.

Electronic sensors are also available that do not trap insects. One example of this type of sensor is described in U.S. Pat. No. 6,937,156, titled, METHOD AND APPARATUS FOR CAPACITIVELY SENSING PESTS, issued Aug. 30, 2005, which is hereby incorporated herein by reference. A sensor as described in that patent may be positioned within a bed bug monitor.

The present invention provides for a method and apparatus for capacitively sensing one or more pests and counting the number of sensed pests. In embodiments constructed in accordance with the principles of the invention, the detector may be employed as either a passive detector and/or as a part of a combined detector and trap. The detector may be used alone or can be used in connection with other devices as part of a report generation system, and also can include the ability to provide additional data on the pests that are detected and/or trapped. Further information may also be logged including movement of the trap, time and date, temperature, light intensity (e.g., day, night, etc.), among other parameters.

The sensor system includes at least two sensor electrodes and a capacitance sensing circuit. As a non-capacitive object (e.g., a pest) approaches the sensor electrodes, then the capacitance of the sensor electrodes increases due to the object having a higher dielectric constant than air. However, the approach of a capacitive object will also be sensed by the detector since it forms a counter electrode and has the effect of decreasing the separation between the electrodes. A capacitance sensing circuit detects the increased capacitance and provides an output signal that a pest has entered the area being monitored. The capacitance sensing circuit may also be constructed to measure the change in the electrode in order to determine the size and/or type of pest based on a predetermined characteristic change. Such changes may be determined by experiment and observation.

As noted above, the present invention may be employed as a stand alone detector or as a combined detector and trap. Further, the present invention can be used by itself or can be utilized in a larger detection and trapping environment. Accordingly, a detailed discussion of the capacitive pest sensor method and apparatus will now be deferred pending a discussion of an automatic pest trap report generation and additional trap parameter data logging environment in which the present invention may be employed.

Automatic Pest Trap Report Generation and Additional Trap Parameter Data Logging Environment The automatic pest trap report generation and additional trap parameter data logging environment system may include a variety of styles of activity sensing pest devices within a single facility (e.g., for trapping or sensing any type of animal, rodent, fly or insect) and utilizing a single reporting database; include individual styles of activity sensing pest devices in different reporting databases for the same facility; and/or include a single type of activity sensing pest devices in one or more reporting databases. In each case, the principles apply to an automatic, real-time reporting system for a plurality of activity sensing pest devices (e.g., traps and/or pest presence monitors), with manual input means for providing additional data on both the pest trap and pest monitor parameters based on physical inspection. A reporting database collects the data and provides reports on the resulting combined data. The system reports have greater utility, improve time, costs and efficiencies associated with inspection of the traps, and improves pest control.

Figure 15:
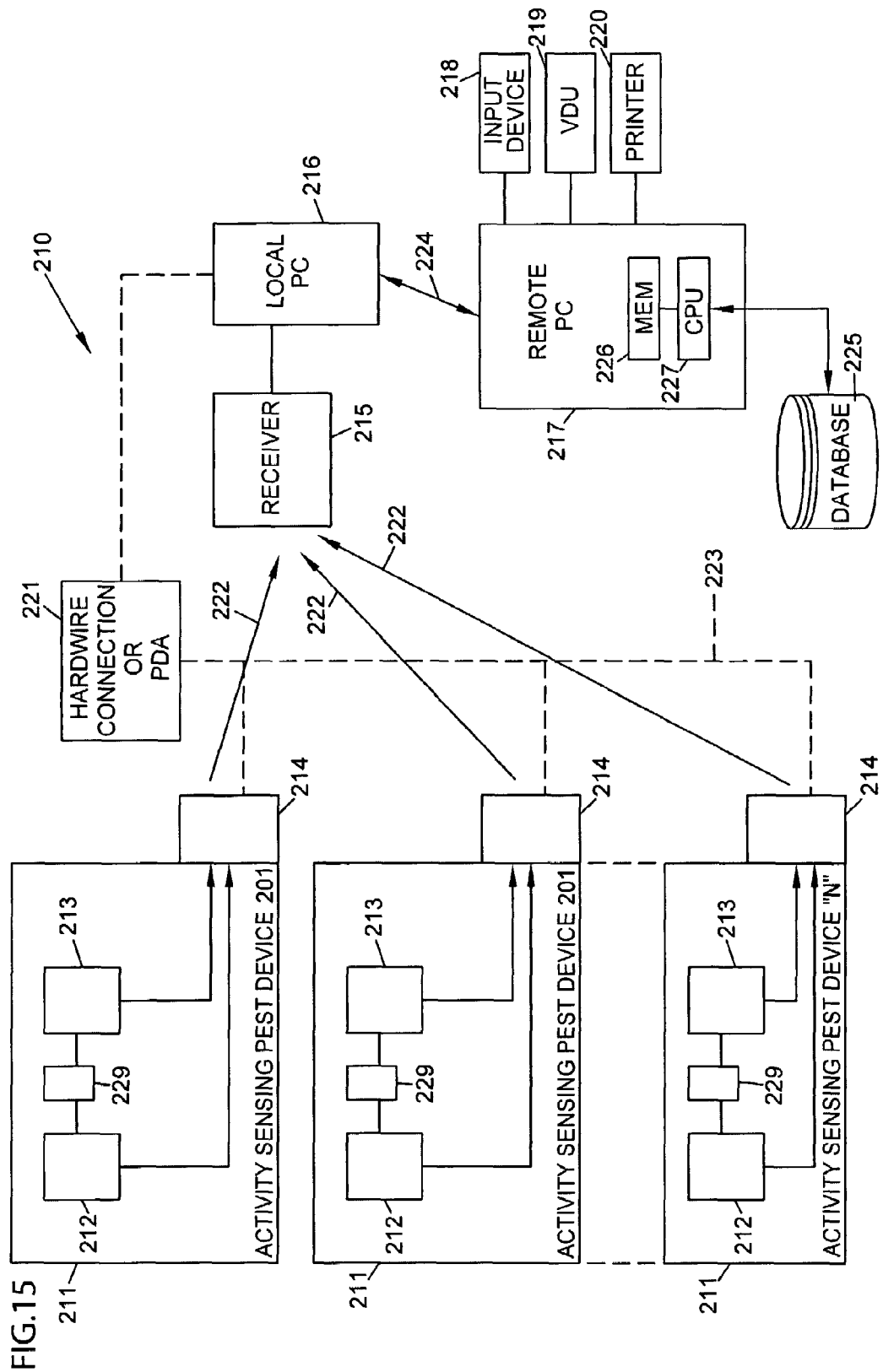
FIG. 15 is a functional block diagram of an automatic pest control report generation with additional trap parameter data system.

First referring to FIG. 15, a functional block diagram of the automatic pest report generation system and additional pest trap and pest monitor parameter data is provided. The system is shown generally by the designation 210. A plurality of activity sensing pest devices are shown at the designation 211. Any number of "N" activity sensing pest devices 211 may be utilized in connection with the present invention. In the case of traps, each of the N traps 211 include a pest enclosing, retaining or killing device (best seen in FIG. 17c discussed further below). One or more of the activity sensing pest devices 211 can also take the form of a passive or active pest monitor--which monitor may or may not include a trapping device. A pest sensor 212, a physical inspection data entry device 213, and a communication block 214 are also provided.

Pest sensor 212 may take a number of forms, but in each form generally monitors pest activity in and/or about the trap 211. Examples of the pest sensor 212 include a switch or mercury switch (for monitoring movement of the trap), a capacitance device (for monitoring a pest altering the capacitance of a grid), a current monitoring device (for detecting current spikes in a destructive or electrocution style trap), or light extinction of a light source (for monitoring an interrupted beam or laser). The sensor 212 is generally located in or on the pest trap 211. However, it is possible to also locate the pest sensor 212 adjacent or proximate the trap 211. It will be appreciated that sensor 212 may be located in an area without a trap being present. In this latter case, the sensor 212 acts as a pest monitor for that area. When pest activity is detected and a pest presence or detection signal is generated by the sensor 212, the pest presence signal is provided to the communication block 214.

The communication block 214 may take a number of forms. For example, the communication block may communicate over a fixed wire (e.g., to hardwire receiver 221 via optional connection 223) or by telephone or cellular phone, it may take advantage of putting signals over existing wiring in a building, or it may utilize over-the-air transmissions designated as 222. In each of these forms, the communication block 214 operates to pass the pest presence or detection signal—as a pest event—to a receiver 215 (or alternatively directly to local PC 216). In one embodiment, an RF type communication device is utilized. In this type of embodiment, the receiver 215 will generally be located relatively close to the transmitter device in communication block 214. However, the range is affected by, among other factors, the type of RF device used and by the structural characteristics of the facility or area. If appropriate communication schemes are utilized, then the receiver 215 may be located off-site. In a second embodiment, a PDA device 221 is utilized to gather the data. In this case, either a cradle (not shown), an IR based connection; or other connection (shown generally as optional connection 223) may be used.

Sensor 212 may include a memory device or other data storage to accumulate event data and then pass along a block of information to the communication device. For example, sensor 212 may be constructed to archive pest presence signals in an onboard memory location or in a separate memory device 229. The later communication of the stored data may occur at set intervals, may be prompted by a polling transaction, or may be physically activated by an inspector via a personal computer, special purpose computing device, or PDA. By storing the data, any number of pest detection events may be transmitted as a block.

In one embodiment the sensor may archive event data in the counter block 805. The counter block 805 can include an electronic memory storage location, and can optionally include a visually perceptible means for displaying the data such as an LCD display or mechanical counter (not shown). The microprocessor block 804 can initiate transmission of the collected data via communications block 807. This can take the form of a PDA 221 establishing contact with the communications block 807 or take another of the forms identified above. The data can be passed as individual event data or as histograms of the number of events within different time windows.

The sensor 212 provides data on the activity sensing pest devices 211 identifier code, the time of the event, and the event itself. However, the PDA 221, receiver 215 or local computer 216 (discussed below) may provide a date stamp for the received pest event. Unless the context provides otherwise, for convenience it will be assumed that the methodology utilized to transmit the data from the sensor is an RF system. Those skilled in the art, however, will appreciate that other methodologies described herein and equivalents may be employed to implement such communication.

Once the event is transmitted to receiver 215, the data is provided to local computer 216. Computer 216 may be a special purpose computing device or may be a personal computer (e.g., an IBM compatible computer having a Pentium style chip). The data is in turn provided to remote personal computer 217 over the internet or direct connection 224. Computer 217 includes a processor 227, input devices 218 (e.g., keyboard and mouse or other pointing device), video display unit 219, and a printer 220. CPU 227 is provided to run a database program stored in memory 226. The program may also be running from a hard drive, floppy drive, CD-ROM, or from a server or other computer on a network machine. The database 225 is stored in memory 226. It will be appreciated that the database may also be stored on a local area network server, hard drive, cd-rom drive or other storage device accessible by the CPU 227.

Database 225 stores the event data and includes other database functions, such as relating events to pest trap identification numbers, and generating reports, among others. A number of commercially available relational database programs may be used capable of storing and relating fields in a number of records. A report writing capability is also desirable. The received data from the various activity sensing pest devices 211 must be recognized by the computer 217 and stored in the database 225. The database 225 can reside on local computer 216 with reports being generated locally and, optionally, transmitted to other computers via a network, extranet or internet.

In the database 225, the activity associated with each activity sensing pest devices 211 may be tracked by the unique ID number. The facility of interest contains any desired number of activity sensing pest devices 211 and the location of the activity sensing pest devices 211 are maintained with the unique ID number to be used in the reporting process. Desirable reports include trap activity data for a specific trap, the activity of traps which have initiated pest presence signals (and other traps which should be visited according to some determined schedule), a summary report with additional trap parameter data added following a physical inspection of the trap(s) and a summary report for each of the traps.

In order to provide the feedback information, each activity sensing pest device 211 also preferably includes one or more feedback devices 213 which permit an inspector to provide physical trap and monitor parameter feedback at the actual location of the activity sensing pest devices 211. This additional data is preferably input to the database 225 running on computer 217 (via the communication block 214 to receiver 215 to local computer 216). The feedback device 213 may take the form of one or more buttons; a keypad; a keyboard; one or more dipswitches; an infrared receiver which is configured to interact with a PDA 221 (e.g., of the type sold under the designation Palm Pilot or other personal data device), or any other input device allowing selection among a plurality of parameter ID's such as those set forth in Table I below. In each case, the device 213 allows an inspector to indicate a particular parameter, from among a predetermined set of parameters. For example, an inspector could indicate that a trap was inspected and no animal was found or that the trap was inspected and an animal was found. Table I includes a representative list of codes which may be utilized by a trap inspector.

TABLE I

| Parameter ID | Parameter Description |
| --- | --- |
| 1 | Trap Checked - No activity |
| 2 | Trap Checked - Activity Type 1 Found |
| 3 | Trap Checked - Activity Type 2 Found |
| 4 | Trap Checked - Activity Type 3 Found |
| 5 | Trap Cleaned |
| 6 | Trap Out of Place |
| 7 | Trap Damaged |
| 8 | Light Bulb Replaced |
| 9 | Glueboard Replaced |
| 10 | Cover Opened |

It will be appreciated that the trap parameter/data is exemplary and other information may be provided. Further, the Parameter ID number is assigned arbitrarily above. In other systems, the parameter ID number may be associated with other trap parameters.

The feedback data can alternatively be entered directly into local computer 216 by an operator after physically inspecting the traps. The data might also be temporarily stored during the inspection in a PDA 221 or other special computing device, and subsequently downloaded into computer 216. In these embodiments, it will be appreciated that the input block 213, communication block 214 and receiver block 215 may be modified to function properly with the data gathering methodology employed. However, transmission of initial data on pest activity is preferred in order to generate an initial report (for example visits to the appropriate activity sensing pest devices can then be determined).

Preferably each activity sensing pest device 211 includes a feedback mechanism 213. Due to the characteristics of the physical premises, the costs, the benefits from the individual activity sensing pest device 211, and other factors, one or more of the activity sensing pest devices 211 may not include a feedback sensor 213. However, in view of the advantages provided by the feedback reporting system as described herein, it will be appreciated that the benefits increase as the amount and quality of the feedback data increases.

Once transmitted to the database 225, the additional parameter data on the activity sensing pest devices is also tracked against the appropriate ID number. This results in a refining of both the data and the resulting reports from database 225. The activity sensing pest devices reporting becomes a feedback loop as illustrated in FIG. 16 by the designation 250. In FIG. 16 the sensors 212 provide data to summing block 251 and to initial report block 252. The physical inspection component of the process includes reviewing the initial report(s) 252 and providing additional physical inspection data at block 253. The physical inspection data can include data on each trap and monitor 211. However, preferably the data is for a smaller set of traps and monitors, which include those traps and monitors that generated a pest activity event signal and a number or percentage of the remaining traps and monitors of the "n" activity sensing pest devices 211 in the facility that did not show any pest activity.

The feedback loop provides data on false positives, disturbed traps, and other factors. The time data corresponding to when the pest activity occurs helps to proactively determine pest infiltration factors and/or information relating to maintaining an optimum pest control plan, such as disturbed traps, etc.

The various styles of traps 211 may include a large variety of commercially available traps for trapping any type of animal, such as rodents or insects. Examples of commercially available live animal/rodent traps are the Victor M310 Tin Cat; the Havahart Live Traps; the Kwik Katch Mouse Trap, and the Kness Ketch-All. Examples of commercially available zapping light traps are the Gardner AG2001; the Gardner AG-661 Light Trap, and the Anderson Adhesive Insect Light Trap. Examples of commercially available glueboard light traps are the Ecolab Stealth Unit; the Gardner WS25; the Gardner GT100, and the Anderson Adhesive Insect Light Traps.

Capacitive Pest Sensor Method and Apparatus

Figure 17A:
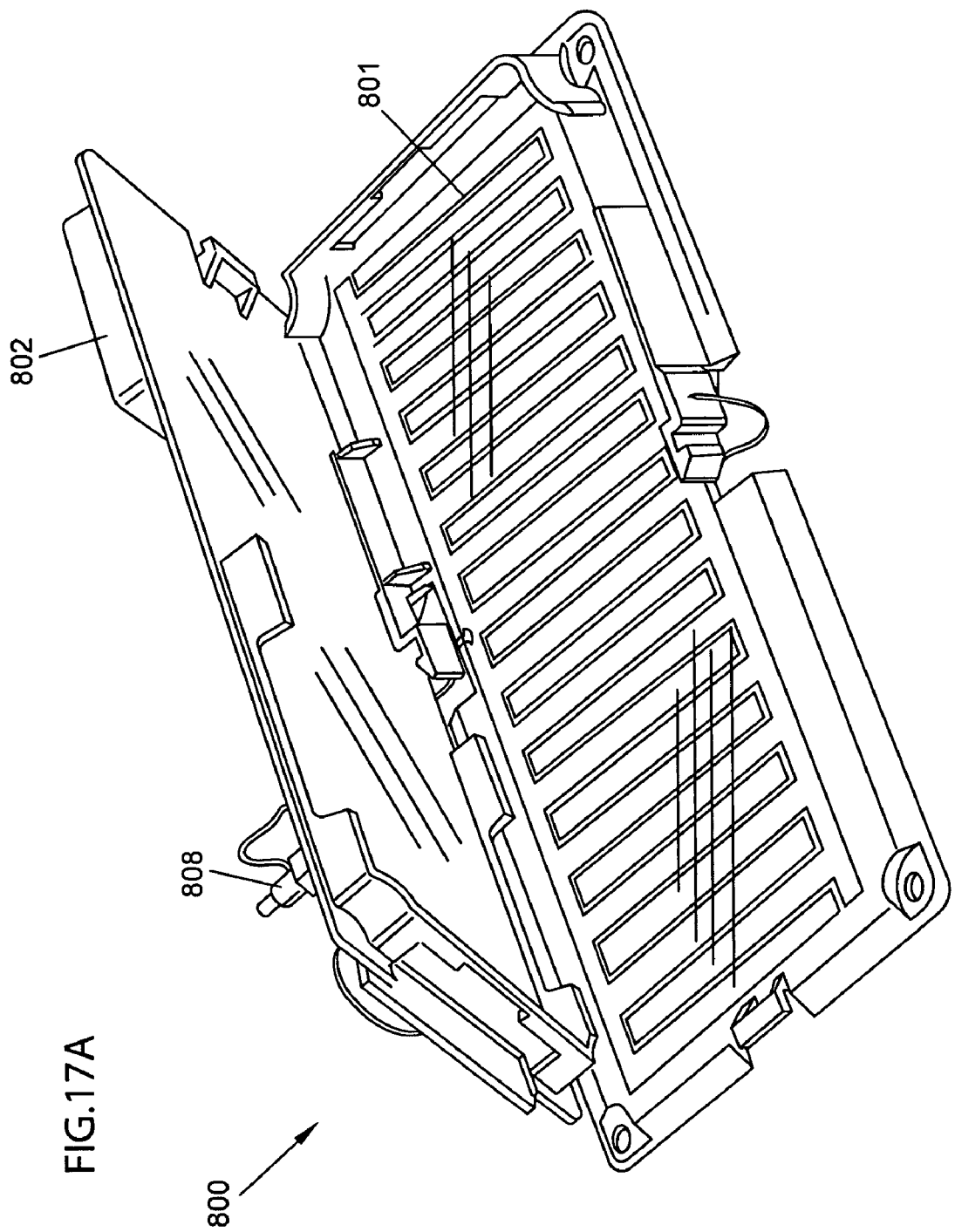
FIG. 17a illustrates a perspective view of an insect monitor having an electrode grid (and the cover partially removed) constructed in accordance with the principles of the present invention.
Figure 17B:
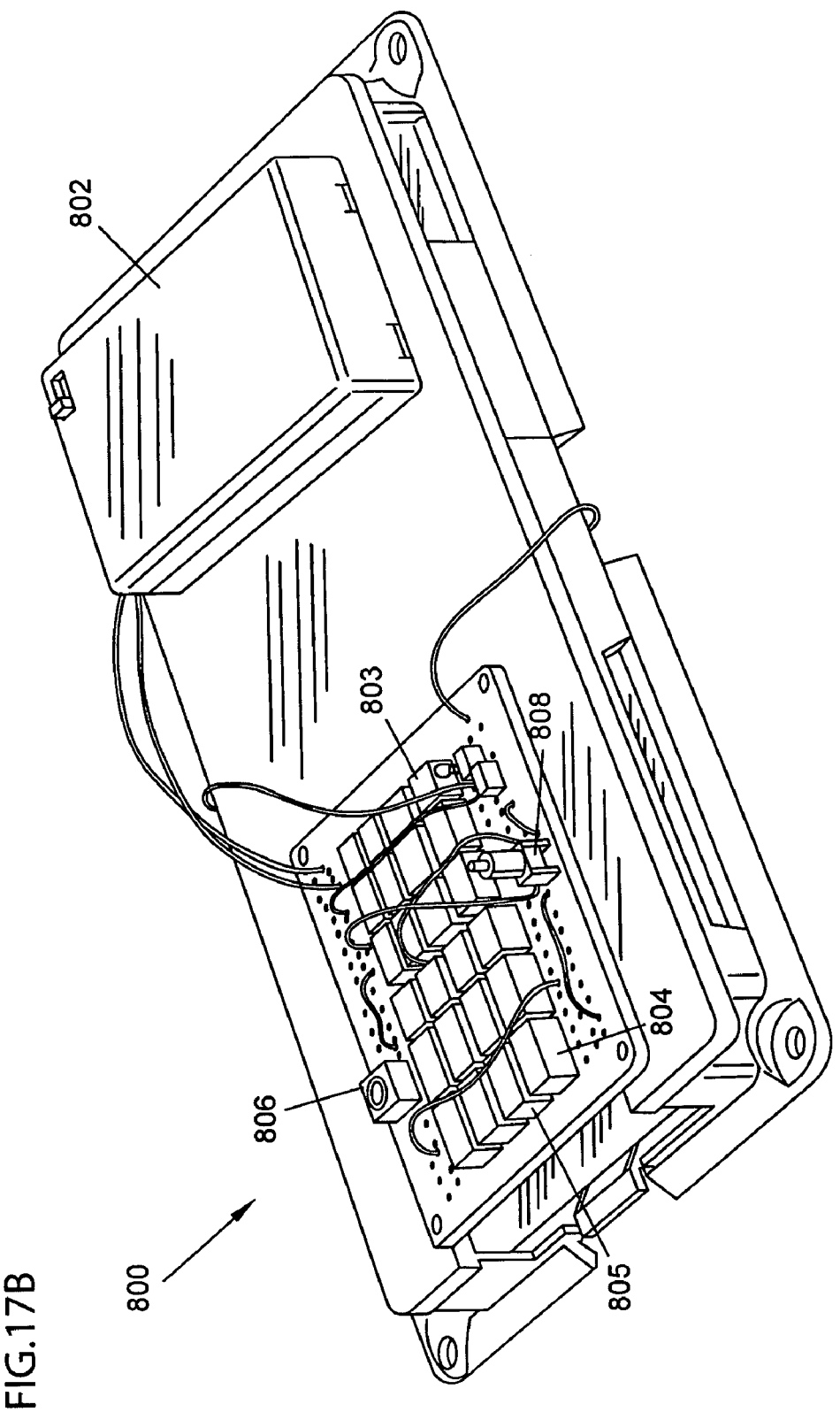
FIG. 17b illustrates a perspective view of the monitor of FIG. 17a with the cover of the insect monitor in place.
Figure 17C:
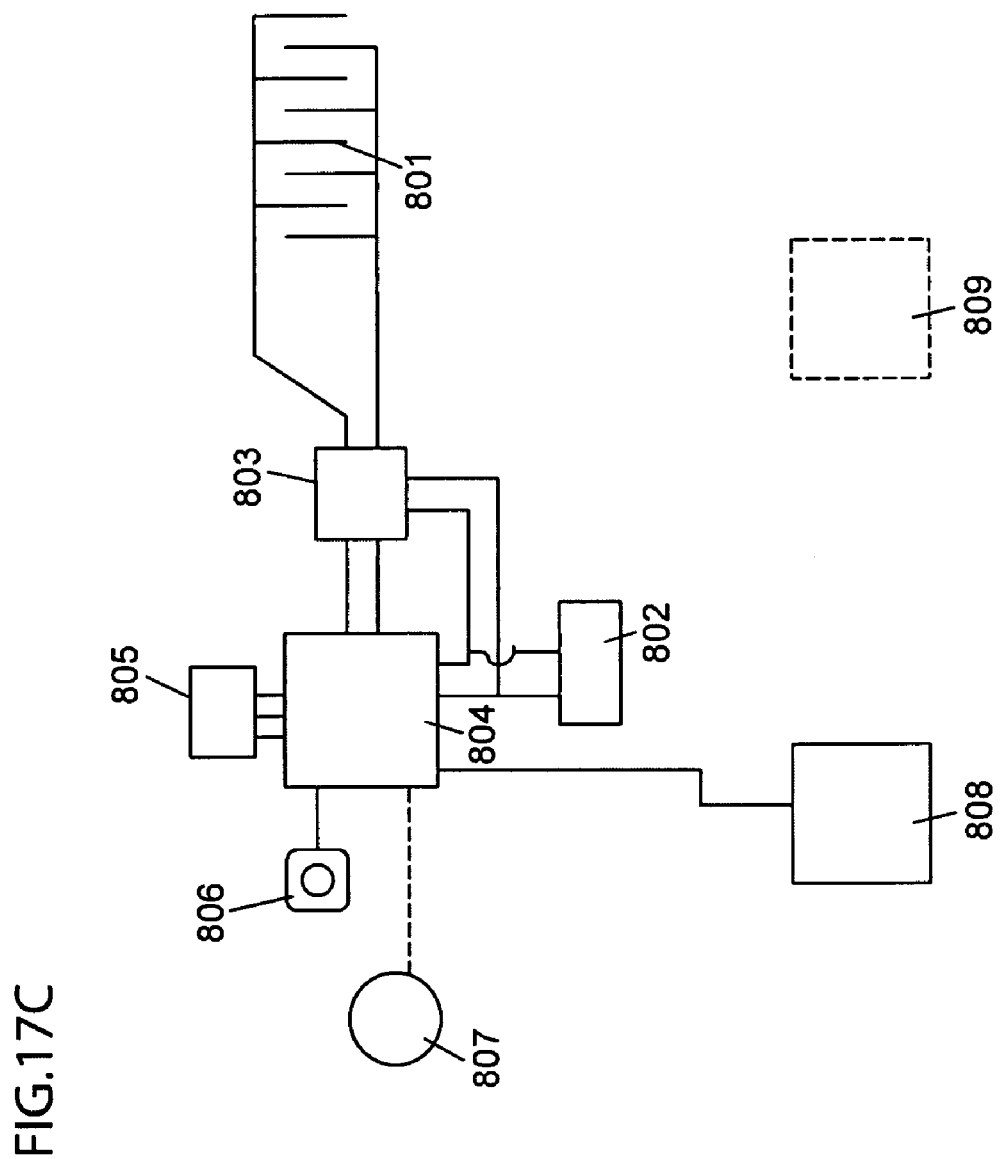
FIG. 17c schematically illustrates a functional block diagram of the insect monitor of FIG. 17a constructed in accordance with the principles of the present invention.

Referring now to FIGS. 17a-17c, an insect monitor 800 with electrode grid 801 is illustrated. Capacitive sensing block 803 is operatively attached to the grid 801. Power block 802 is connected to the capacitive sensing block 803 and to the microprocessor block 804. Memory block 805 is connected to the microprocessor block 804 (and/or the microprocessor can have its own on board memory; not shown). Switch block 808 is connected to the microprocessor block 804 to provide user feedback input. JR device 806 is provided to enable input and output communication with a PDA 221 or other JR communication device. An RF device 807 may also be connected to microprocessor block 804 to provide RF communication for the monitor 800.

Capacitive sensing block 803 is arranged and configured to detect changes in the capacitive coupling between the electrodes of grid 801. When an insect enters the monitor 800, the insect provides capacitive coupling between the electrodes of the grid 801. The change is sensed by the capacitive sensing chip 803. The time and date of the event is determined by the microprocessor block 804 and may be stored in memory 805 or can be transmitted directly to a computer 16 via RF device 807. If the data is stored in memory block 805, it may be transmitted at a latter time (e.g., in a batch mode) via RF device 807; it can be stored for transmission to a PDA device 221 via IR device 806; and/or it can be transmitted after additional data is entered at manual input device (switch) 808. If RE device 807 provides for two way transmission, the information can also be transmitted after a polling transmission by computer 216 (via receiver block 215).

Prior art devices of this type of monitor are often accomplished by use of glue boards with plastic covers or strategically placed attractants. A limitation of these devices is that a service technician does not have the ability to determine when the activity occurred during the service cycle. The monitor shown in FIGS. 17a-17c allows the comparison not only of activity in multiple monitors but also allows technicians to determine if activity occurred at the same time. An additional limitation of traditional monitors is that technicians can report they visited a monitor without actually having visited the monitor. Therefore, the feedback buttons 808 (best seen in FIG. 17c) insure that the monitor was inspected, as well as documenting the inspection process. A further benefit of the monitor 800 of FIGS. 17a-17c is that the monitor does not have to immobilize the insect to communicate the activity to the inspector. This benefit allows the database 225 to report on the activity in a facility without causing customers or inspectors to view unsightly insects.

Block 809 illustrates an optional trapping option used in connection with the detector. The trap 809 may be a glue board, electrocution grid, passive trap, etc. The detector can include a sensor to sense if a pest has been trapped in order to provide a pest or no pest signal and/or to trigger a signal indicating that the trap should be checked. The output signal can be a visible or audible indicator that is integral to the trap, or a signal that is transmitted to a remote location. Remote signaling may be accomplished via phone, internet, RF signal and other well known transmission schemes.

Figure 18B:
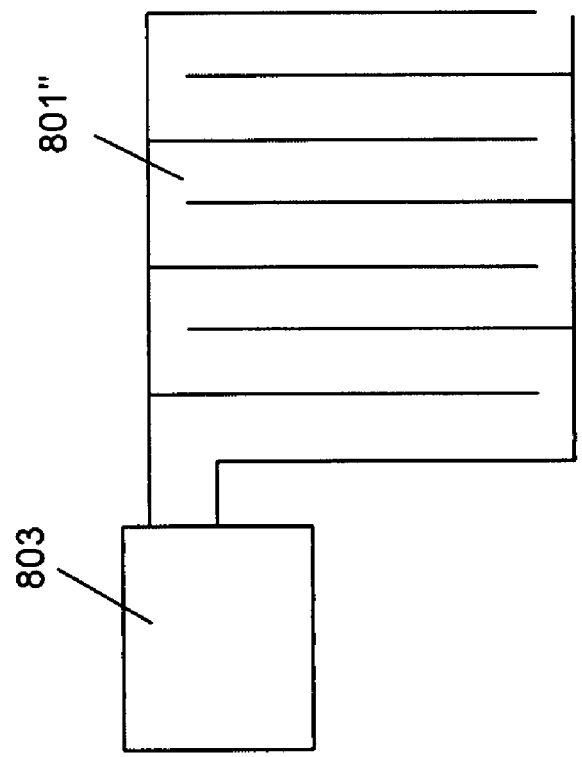
FIGS. 18a and 18b illustrate first and second embodiments of the electrodes of the capacitive detector.
Figure 18A:
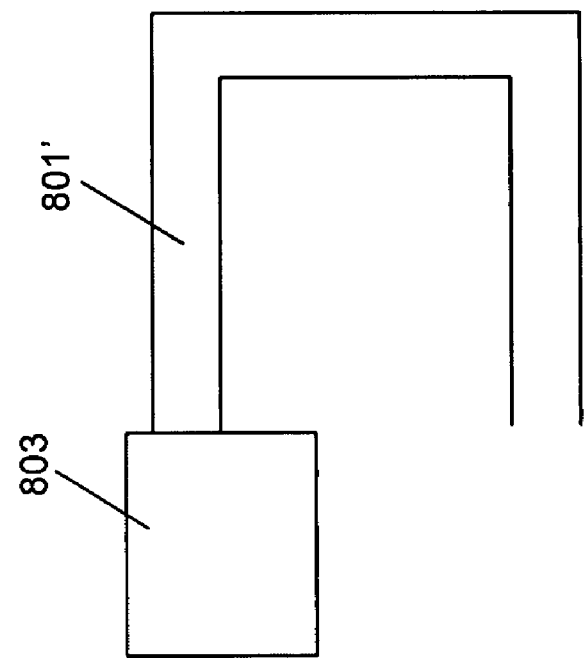

FIGS. 18*a* and 18*b* illustrate first 801' and second 801" embodiments of the electrode grid 801 of FIG. 17*c* respectively. FIG. 18*a* illustrates a perimeter design 801' having two parallel lines. In this design, a pest is sensed when it interacts with the electric field associated with the lines. When this occurs, the capacitance changes while the pest is in the proximity of the line(s). This type of design lends itself well to extending about the perimeter of an area to be monitored. However, the lines do not have to extend about the entire perimeter of the area. It will be appreciated that different configurations may be desirable depending on the type of pests being monitored and the physical premises. FIG. 18*b* illustrates an area design 801" having an interdigitized style electrode grid. Here the capacitance changes when a pest enters the area. The capacitance then stays at approximately the same value as long as the pest remains in the area. If a second pest enters the area (and/or if the first pest leaves the area), then the capacitance changes to a new level and the presence of the pest can again be detected. This type of design lends itself well to monitoring an area.

The electrode 801 may be constructed separately out of copper foil or other conductive metal. Alternatively, the electrode 801 may be constructed integrally with a circuit board of the sensor system.

Figure 19A:
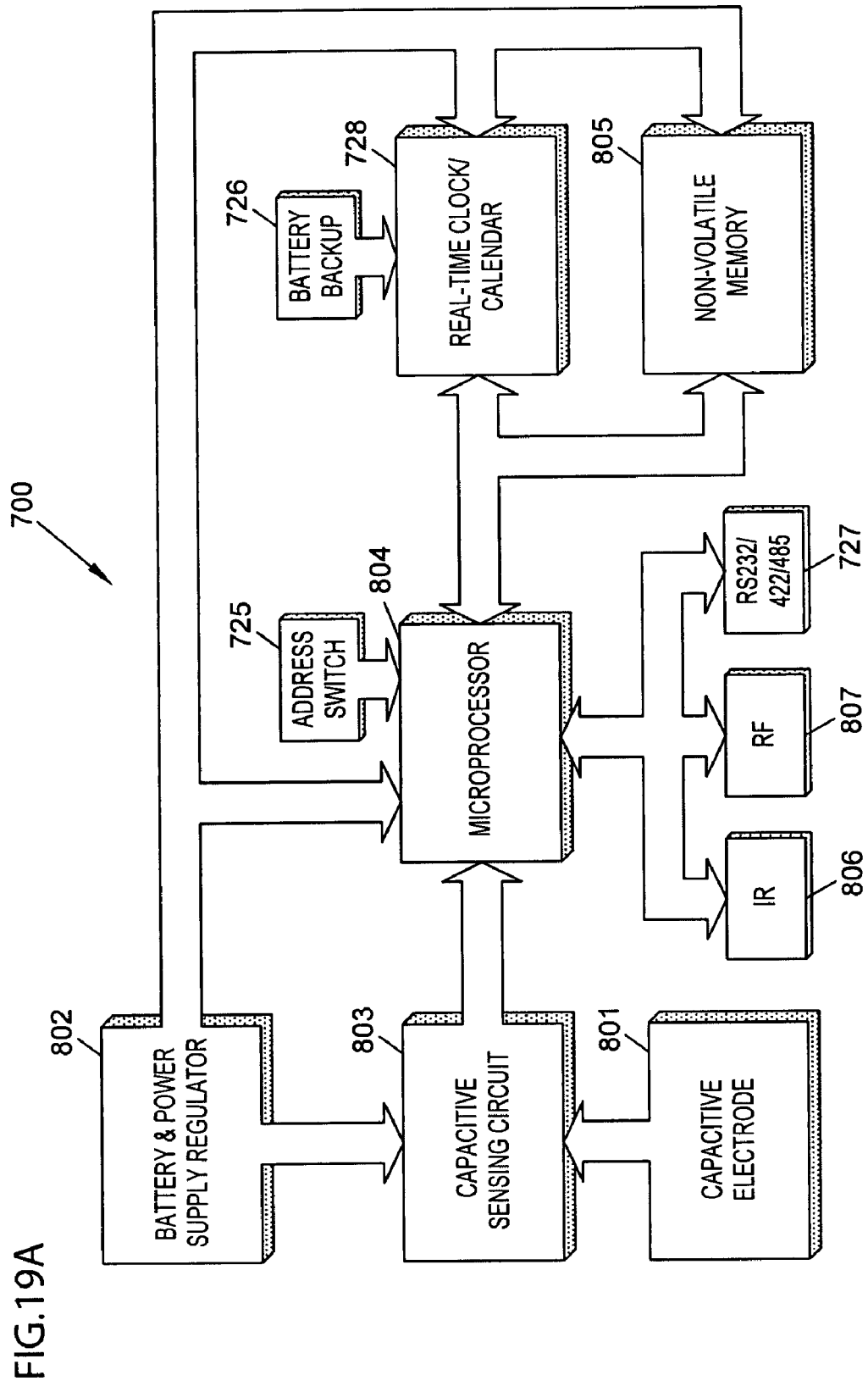
FIG. 19a schematically illustrates a functional block diagram of the capacitive detector 700 wherein the device includes a microprocessor.
Figure 19B:
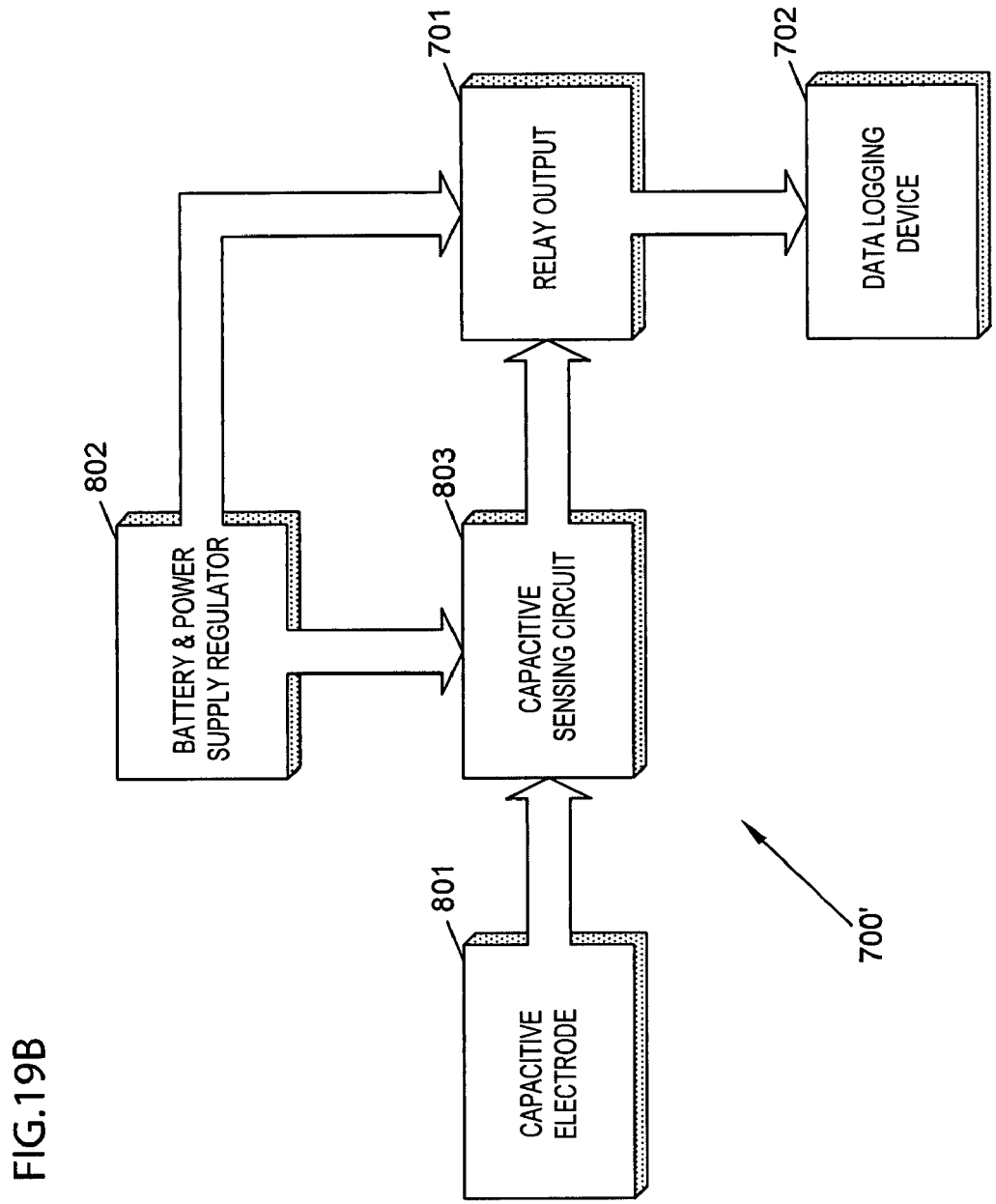
FIG. 19b schematically illustrates a functional block diagram of the capacitive detector 700' wherein the device does not include a microprocessor.

FIGS. 19*a* and 19*b* graphically illustrate alternative embodiments in which a microprocessor is utilized (FIG. 19*a*) and in which a microprocessor is not utilized (FIG. 19*b*). Turning first to FIG. 19*a*, a functional block diagram of the capacitive detector 700 is illustrated wherein the device includes a microprocessor substantially as described above in connection with FIG. 17*c*. However, in FIG. 19*a*, an address switch 725 for the microprocessor 804, a battery backup 726 for the real-time clock calendar block 728, and an additional output port block 727 (preferably an RS-232 or 422 and/or 485 port) are also shown.

In the preferred embodiment, the various functional blocks may be generally implemented with commercially available chipsets. The microprocessor block 804 preferably provides processing functionality and includes a processor such as the Microchip PIC 16F873. The memory block 805 preferably provides non-volatile memory functions and may be implemented with a serial EEPROM device such as 24LC256 chip manufactured by Microchip. Such device is a CMOS design to provide for low power consumption. The real-time clock calendar block 728 providing time and date capability may be implemented with a serial real time clock/calendar chip such as the PCF8563CMOS chip manufactured by Philips. The communications block 727 may be implemented with an RS-232 transceiver chip of the type designated MAX3226E manufactured by Maxim. The capacitive sensing circuit block 803 may be implemented with a capacitive sensing circuit manufactured by Quantum Research Group under the designation Qprox QT113. The address switch block 725 for setting a device ID or device addresses may be implemented with any number of switch type devices, including a six-position dip switch.

The preferred devices used to implement the embodiment illustrated in FIG. 19*a* collectively provide for a low power device capable of operating for extended periods (e.g., 3-6 months) on a low power voltage source (e.g., three standard AA alkaline batteries). The low power consumption is achieved due to the low quiescent current requirements of the preferred devices for the voltage regulator block 802, the memory block 805, the real-time clock/calendar block 728, and the RS-232 communication block 727. The microprocessor block 804 also supports low power consumption by utilizing a low power mode. The low power mode includes a sleep command that turns off the oscillator driver. When the oscillator is turned off, then the device may run on a standby current of less than 1 µA.

In operation, the microprocessor block 804 initializes by obtaining the device ID from the address switch block 725. A default date and time are then set. A thirty (30) minute alarm is set in the real time clock ("RTC") block 728. Finally, the memory block 805 pointers are set to zero. After initialization the microprocessor block 804 puts itself in the low power mode (i.e., sleep mode) to conserve battery power. The microprocessor block 804 is awakened from sleep mode by any one of three sources: the capacitive pest sensor block 803; the RTC block 728; or the communications port block 727.

When the capacitive pest sensor block 803 senses a pest, then microprocessor block 804 'wakes up' from sleep mode and adds one count to the running pest count. The new count value is stored in memory block 805. The microprocessor block 804 then returns to sleep mode. The microprocessor block 804 wakes up every thirty (30) minutes based on a wake-up call (i.e., an alarm) programmed into the RTC block 728. The microprocessor block 804 logs the date, time and the current pest count number in the next available memory block 805 space.

The microprocessor block 804 also wakes up from input to the communications port block 727. The communications port can then be used to set the device date and time, read the device date and time, read the device data log of stored pest activity, clear the device data log, and read the device ID dip switch setting. Other parameters may be logged such as light intensity, temperature, movement of the detector, etc. When the communications port block 727 is disconnected, the microprocessor block 804 returns to sleep mode.

A software algorithm arbitrates priority of the wake up modes. Input from the capacitive sensing block 803 is the top priority. Data logging of pest activity on alarm intervals is second priority. The lowest priority is given to the communications port block 727.

Another feature of the device is a power-OK or low battery function of the power block 802. The voltage regulator signals the microprocessor block 804 when a low battery condition exists and a low battery data log entry is made. The RTC block 728 employs a battery back-up circuit such that in the event of a low battery condition, then the current date and time are retained.

Turning next to FIG. 19*b*, an alternative capacitive detector 700' in which a microprocessor is not employed is illustrated. In this embodiment, the capacitive electrode 801 is connected to the capacitive grid 803. The power block 802 is comprised of a battery and power regulator. Power block 802 is cooperatively connected to the capacitive sensing circuit 803 and the relay output block 701. Relay output block 701 is also connected to data logging block 702. This alternative capacitive pest detector 700' utilizes a dry contact relay as an output. The output can be used to signal any number of outboard devices for pest activity.

Figure 20:
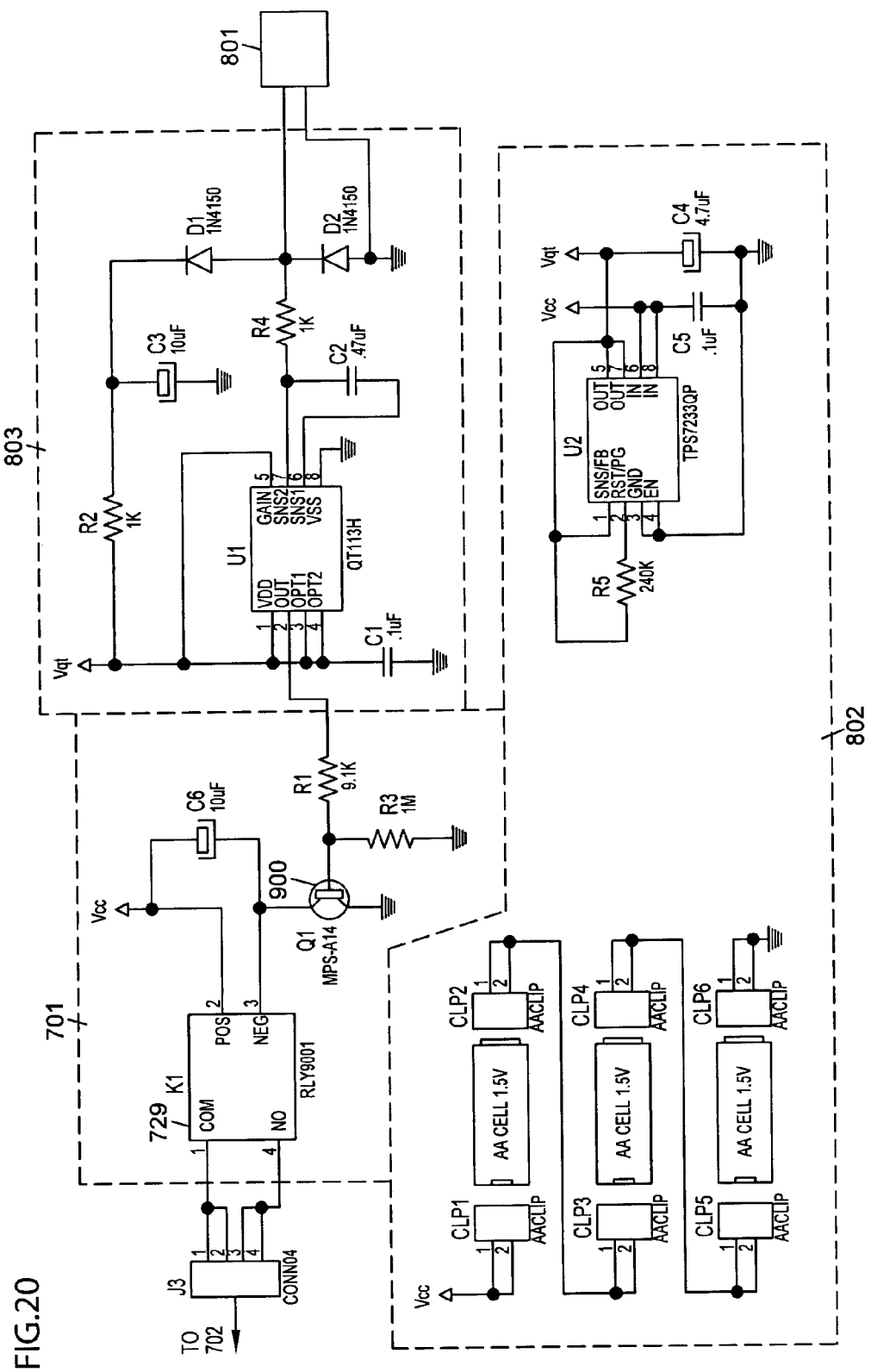
FIG. 20 illustrates a preferred embodiment capacitive sensing circuit which may be employed in connection with the present invention.

In this alternative design, the capacitive sensing circuit block 803 preferably includes a QProx QT113H chip manufactured by Quantum Research Group. The electrodes 801 are preferably etched directly into the printed circuit board on which the electronics resides. The output of the capacitive sensing circuit block 803 preferably drives an open collector switching transistor 900 (best seen in FIG. 20) to control a single pole single throw (SPST) normally open dry contact reed relay 729. FIG. 20 illustrates the manner in which the capacitive sensing circuit block 803, the battery and power supply regulator block 802 and the relay output block 701 is preferably implemented. It will be appreciated, however, that this preferred schematic is illustrative and other circuits may be used to provide the functionality described for these functional blocks.

The data logging block 702 may be implemented with a data logging device manufactured by Omega Engineering under the designation OM-CP-PULSE 101. This device may be cooperatively connected to the relay output block 701 to track pest activity. The data logging block 702 records the activity as well as the time and date of the activity. A communications port (not shown) may be connected to download the logged activity.

In operation, when a pest enters the electrode 801 area, the capacitive sensor block 803 triggers the relay block 701 for a time period. In the preferred embodiment, the maximum time period is ten (10) seconds. However, this time period is a function of the capacitive sensor chip used in the preferred embodiment and so other time periods may be used. When the relay block 701 is closed, then the data logging block 702 counts the contact closure. On pre-programmed intervals, the data logging block 702 saves the current count to non-volatile memory internal to the data logging block 702. Periodically, the information is downloaded to a computer via the communications port (not shown). In the preferred embodiment, the data may be downloaded into a spreadsheet or other programs that can read comma separated files (CSV).

Detection

Once a bed bug has encountered a bed bug monitor, it is important that this encounter be known to the managers or owners of a location as quickly as possible. The design of the bed bug monitor can facilitate easy and early detection of the presence of bed bugs.

Visual inspection of a bed bug monitor is one mechanism for detection. To facilitate visual inspection, a portion of the trap may be easily removable and replaceable, may be transparent, or may be structured so that any bed bugs are readily apparent.

However, it is not desirable for bed bugs on the bed bug monitor to be easily viewable by customers within the establishment. This concern may be addressed by the positioning of the bed bug monitor within the room, as discussed further herein. In addition, the design of the bed bug monitor may provide additional concealment of any bed bugs from members of the public who are not trained in how to inspect the monitor.

It may also be desirable that housekeeping staff who visit the room on a daily basis are not alerted to the presence of bed bugs. On the other hand, housekeeping staff may be utilized to inspect the monitors on a daily basis to ensure the earliest possible detection.

Other examples of detection mechanisms that facilitate the speedy removal of any bed bugs include a light that is activated on the monitor when a bed bug is detected or retained, an electronic signal that is sent from the bed bug monitor to a control panel, or a color change in a material of the trap. An electronic signal may be used to generate a voicemail message or an electronic mail message to alert management to the presence of bed bugs.

Placement and Servicing

The bed bug monitor can be positioned in a discreet location in a room. For example, the bed bug monitor may be positioned behind a headboard, where it is not likely to be viewed by patrons of the establishment. A pressure sensitive adhesive may be used to secure the bed bug monitor to a hidden surface within the room. Alternatively, a screw, nail or tack may be used to affix the bed bug monitor to a surface.

Another possible location for the bed bug monitor is under a box spring or under a mattress. Pressure sensitive adhesive could be used to affix a bed bug monitor in this location.

It may be desirable to position the bed bug monitor so that a torturous path to the bed bug monitor is required. With this type of positioning, a hotel guest would be least likely to view the monitor.

Many crawling insects prefer to walk along edges, and this behavior may be utilized to direct the bed bugs toward the monitor. The bed bug monitor may be positioned along an edge of a wall or headboard structure, or the monitor itself may incorporate guide walls.

Many different configurations for the bed bug monitor are possible so that access openings are defined between guide walls that are sufficiently large to allow the bed bugs to pass through, and sufficiently close to make it likely that a bed bug will encounter a guide wall and follow it to the retention mechanism. Alternatively, guide arms may extend from the bed bug monitor to increase the likelihood that bed bugs will be directed toward the suppression means. Pheromones or other attractants may be placed along the edges of guide arms or guide walls. The bed bug monitor can be positioned on a horizontal surface or a vertical surface or a surface that is neither horizontal nor vertical (e.g., on an incline).

Examples of Configurations for Bed Bug Monitors

Examples of bed bug monitors will now be described. FIG. 1 shows a side view of a bed bug monitor 10 using a fluted cardboard layer 12. As discussed above, bed bugs are attracted to the rough surface of cardboard. In addition, the fluting of cardboard layer 12 provides crevices for the bed bugs to crawl into. The fluted cardboard layer is sandwiched by a first glueboard 14 and a second glueboard 16 in this embodiment. An adhesive layer 18 and 20 is positioned on each glueboard on the side that contacts the fluted cardboard layer 12. As a result, when bed bugs crawl into the crevices of the cardboard, they will contact the adhesive layer 18 or 20 and become immobilized. The adhesive layer also serves to secure the glueboards to the fluted cardboard layer.

Cardboard liners 22 and 24 sandwich the rest of the construction. Either of the outside surfaces of cardboard liners 22 or 24 may be provided with a pressure sensitive adhesive for adhering the monitor 10 to a surface. Adhesive may be used to secure the cardboard liners to the glueboards.

Figure 2:
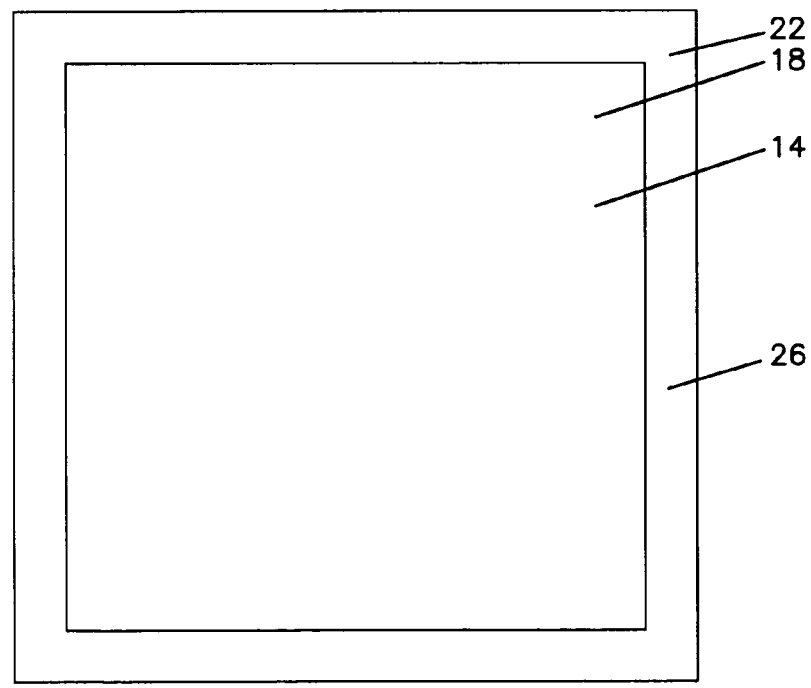
FIG. 2 is a top view of a cardboard and glueboard component of the bed bug monitor of FIG. 1.
Figure 3:
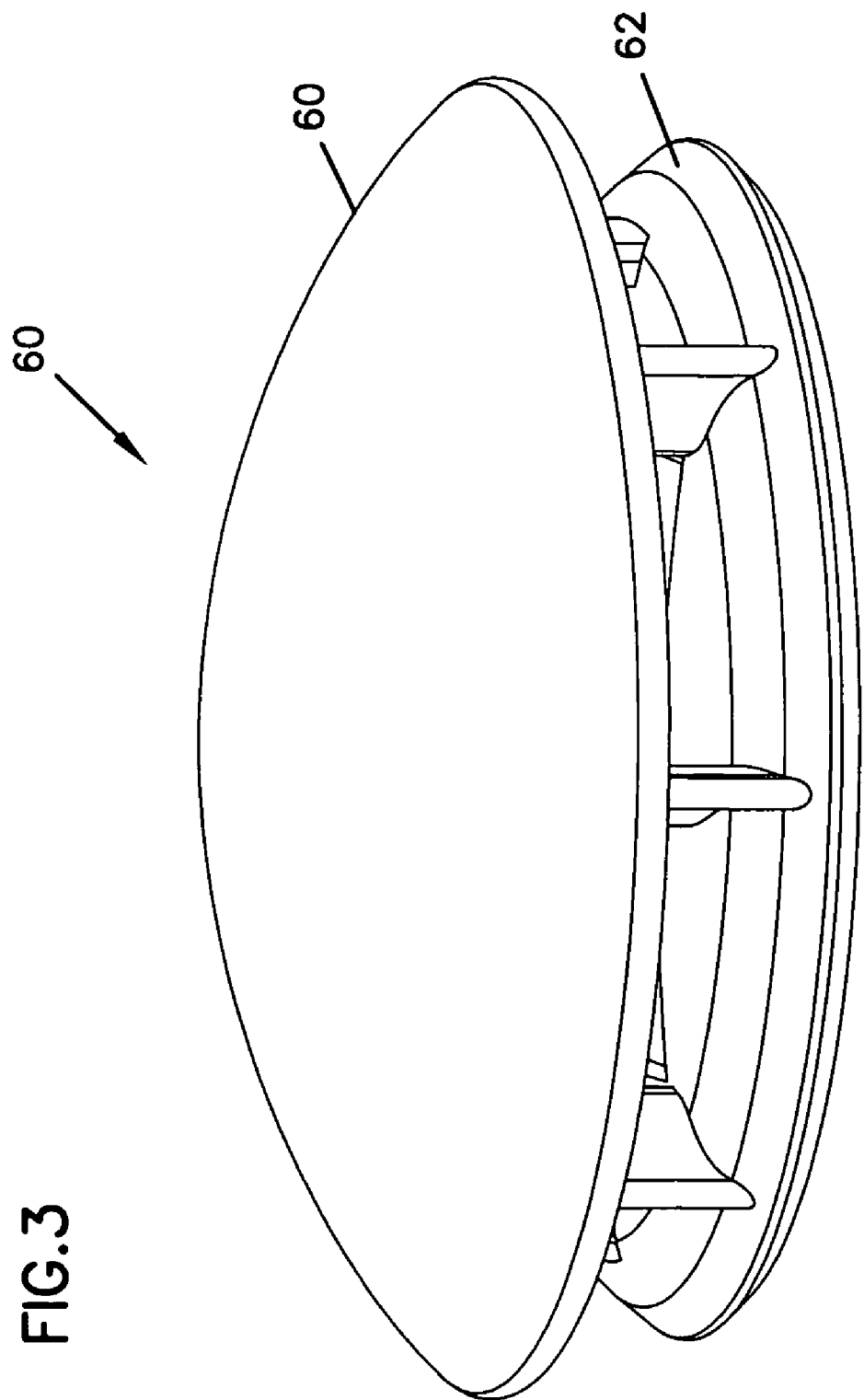
FIG. 3 is a perspective view of a bed bug monitor according to a second embodiment of the present invention.
Figure 4:
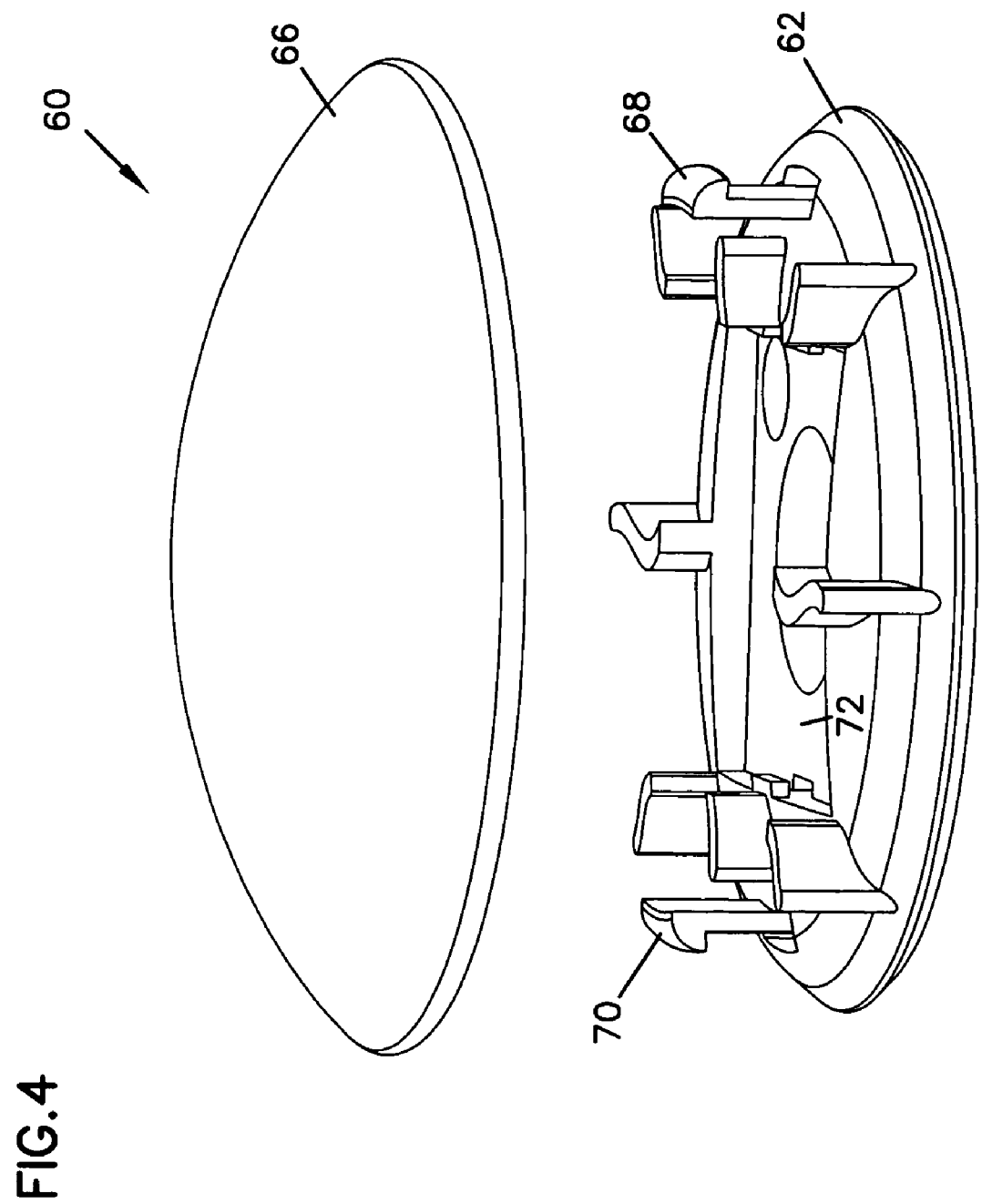
FIG. 4 is an exploded view of the bed bug monitor of FIG. 3.
Figure 7:
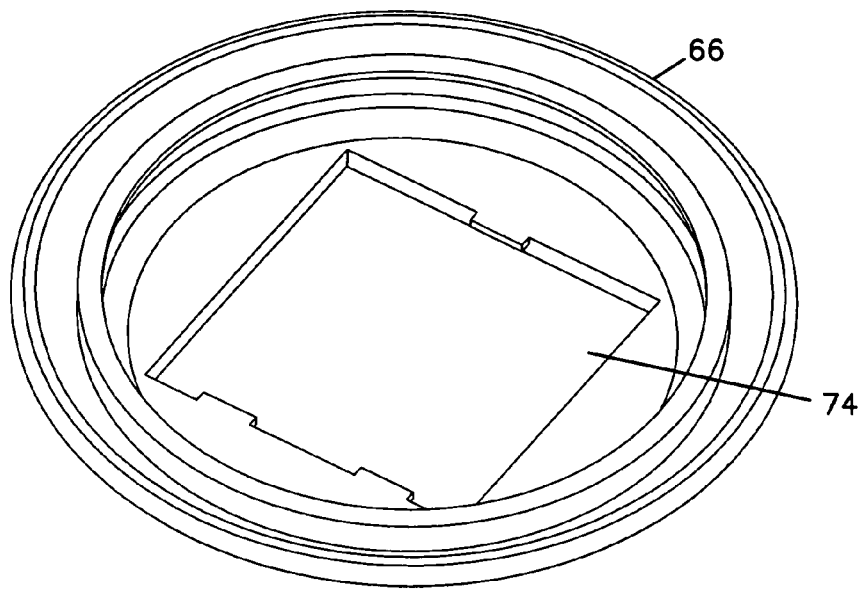
FIG. 7 is a side exploded view of the bed bug monitor of FIG. 3.

FIG. 2 shows a cardboard liner layer 22 with a glueboard 14 positioned on it. The glueboard 14 includes an adhesive 18 for immobilizing insects. The perimeter portion 26 of the cardboard liner 22 provides an area where a user can grasp the structure without encountering the adhesive 18.

In one alternative example, the bed bug monitor is similar to that of FIG. 1 but without the cardboard liners 22 and 24.

An additional example embodiment would be to provide the cardboard fluted layer of FIG. 1 and a single glueboard, leaving one surface of the cardboard fluted layer exposed. In this configuration, one side of the glueboard has an adhesive designed to immobilize insects and this side is adhered to the cardboard fluted layer. The opposite side of the glueboard is provided with a pressure sensitive adhesive for securing the monitor to a surface. Alternatively, no pressure sensitive adhesive is provided on the opposite side of the glueboard and a tack or other attachment mechanism is utilized. Many different permutations of the elements of FIG. 1 are also possible.

The monitor 10 is two inches square in one embodiment. It is also possible to have a monitor of one to three inches square, inclusive, and to have form the monitor in shapes other than squares.

FIGS. 3-7 show an alternative example of a bed bug monitor. The bed bug monitor 60 of FIGS. 3-7 includes two main parts: a base 62 and a cover 66. The cover 66 may be removed from the base 62 by squeezing the cover to disengage the cover from the halves 68, 70, shown in FIG. 4. More detailed information about the structure of the bed bug monitor 60 is available in U.S. patent application Ser. No. 10/697,705, titled INSECT SUPPRESSION STATION, filed Oct. 29, 2003, which is hereby incorporated herein in its entirety. The incorporated patent application describes the structure of FIGS. 3-7 and how that structure may be used as a suppression station for insects. The structure is also well suited for use as a bed bug monitor because it provides the ability to retain glueboards in recessed areas within the trap. A glueboard may be received in a lower recess within the base 62 or in an upper recess within the cover 66.

Other details of the structure of the monitor 60 are described in the patent application that is incorporated by reference, Ser. No. 10/697,705 and therefore will not be described further. However, certain features of the trap 60 as depicted in the figure can be modified to achieve a slightly different example embodiment that is well suited as a bed bug monitor also. For example, the cover 66 shown in FIGS. 3-4 may be a flat cover instead of a domed cover. A dome shaped cover is useful for preventing water or other liquid from reaching the insect suppression devices within the monitor, for example when the device is used in kitchens or other areas that may be cleaned by being hosed down. However, since the bed bug monitor is likely to be used in bedroom locations and unlikely to encounter large amounts of water, the flat cover is preferable. The flat cover allows the device to have a lower profile and be less apparent to patrons.

The base 62 of the bed bug monitor 60 may be made of a fairly rigid plastic material, such as high impact plastic or ABS plastic, while the lid 66 is made of a plastic that is more flexible than the base 62. In one embodiment, the base and lid materials are water resistant and/or impact resistant. Some examples of base and lid materials are thermoformed plastics such as high impact polypropylene (HIPP), and acrylonitrile butadiene styrene (ABS). Other possible materials include polychlorotrifuoroethylene (PCTFE), polyvinylidene chloride (PVDC), or high-density polyethylene (HDPE). In addition, the station may be formed of non-plastic materials such as cardboard, wax paper board, galvanized metal, aluminum, and wood.

Figure 9:
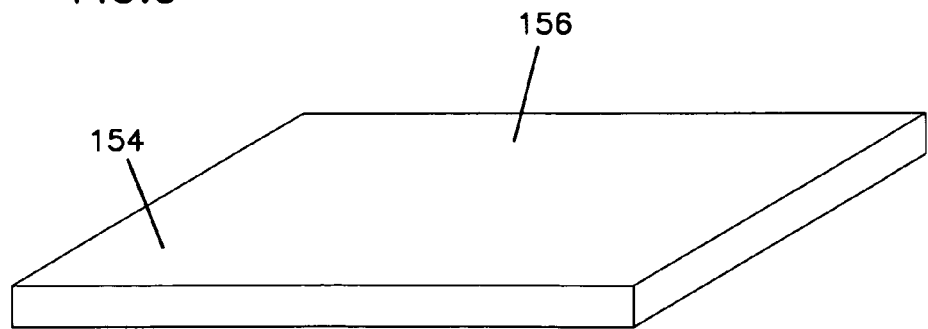
FIG. 9 is a perspective view of a glueboard of the present invention.
Figure 10:
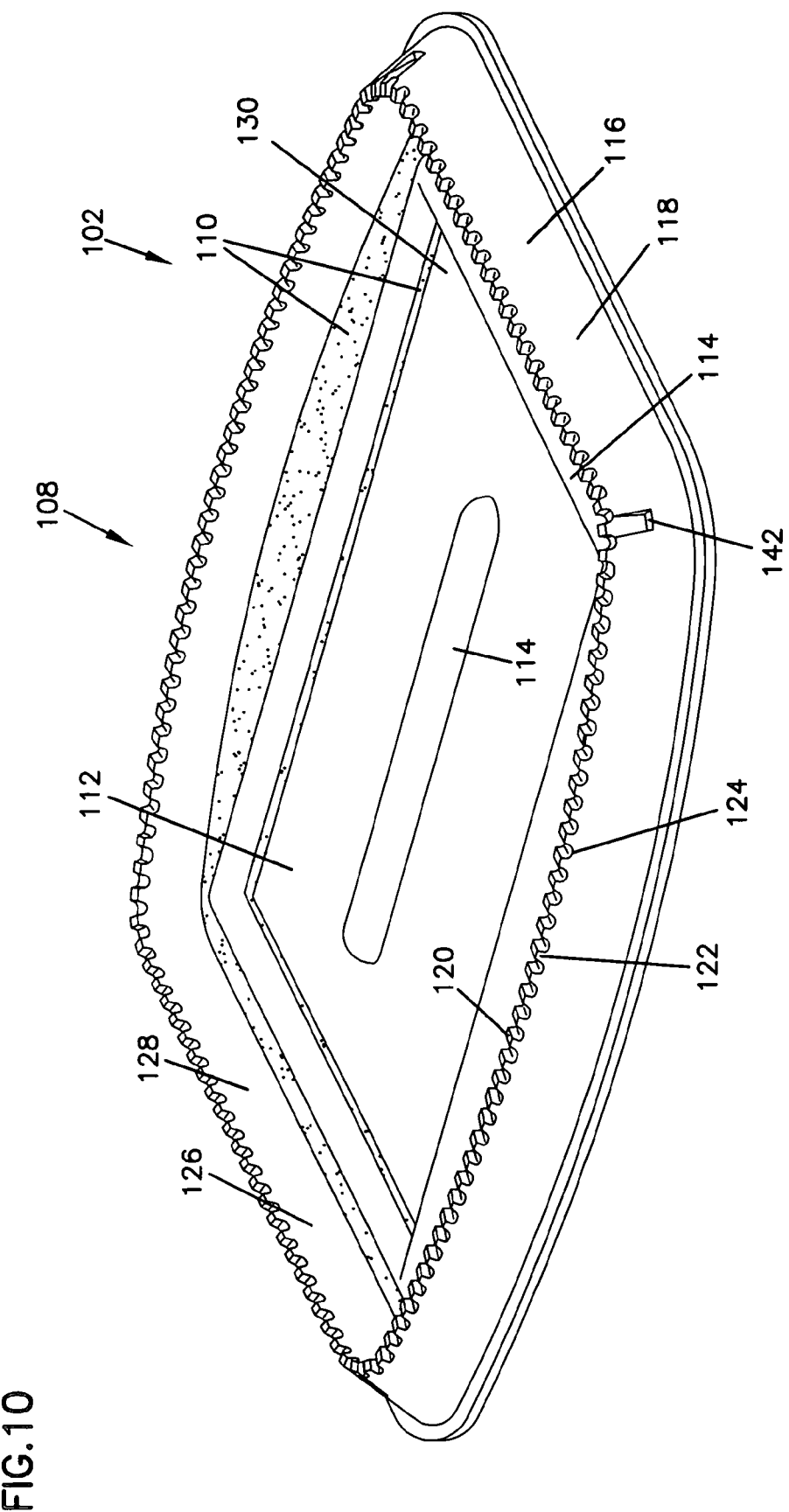
FIG. 10 is a perspective view of a portion of a bed bug monitor containing a chemical heat source.
Figure 11:
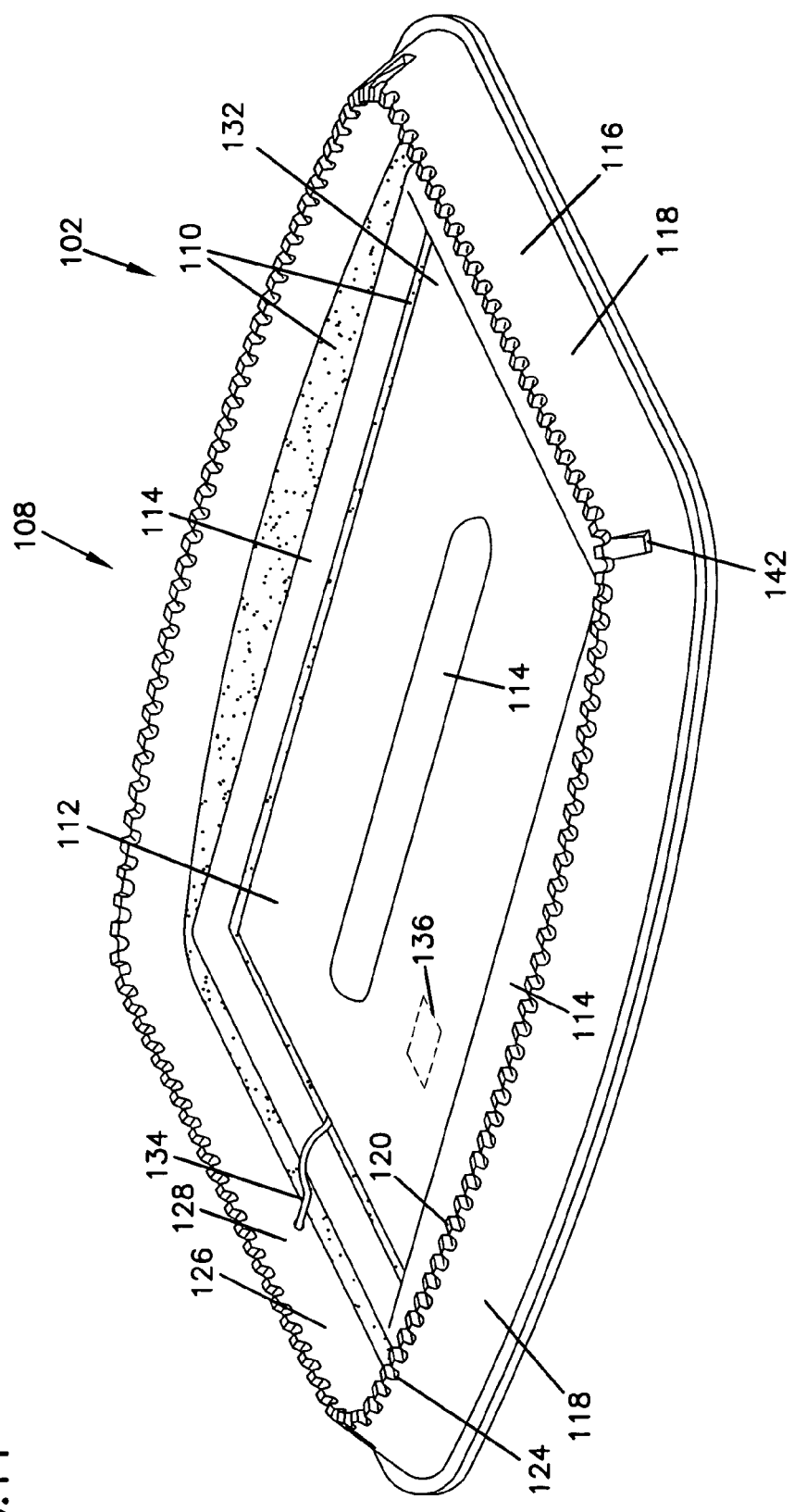
FIG. 11 is a perspective view of a portion of a bed bug monitor containing an electrical heat source.
Figure 12:
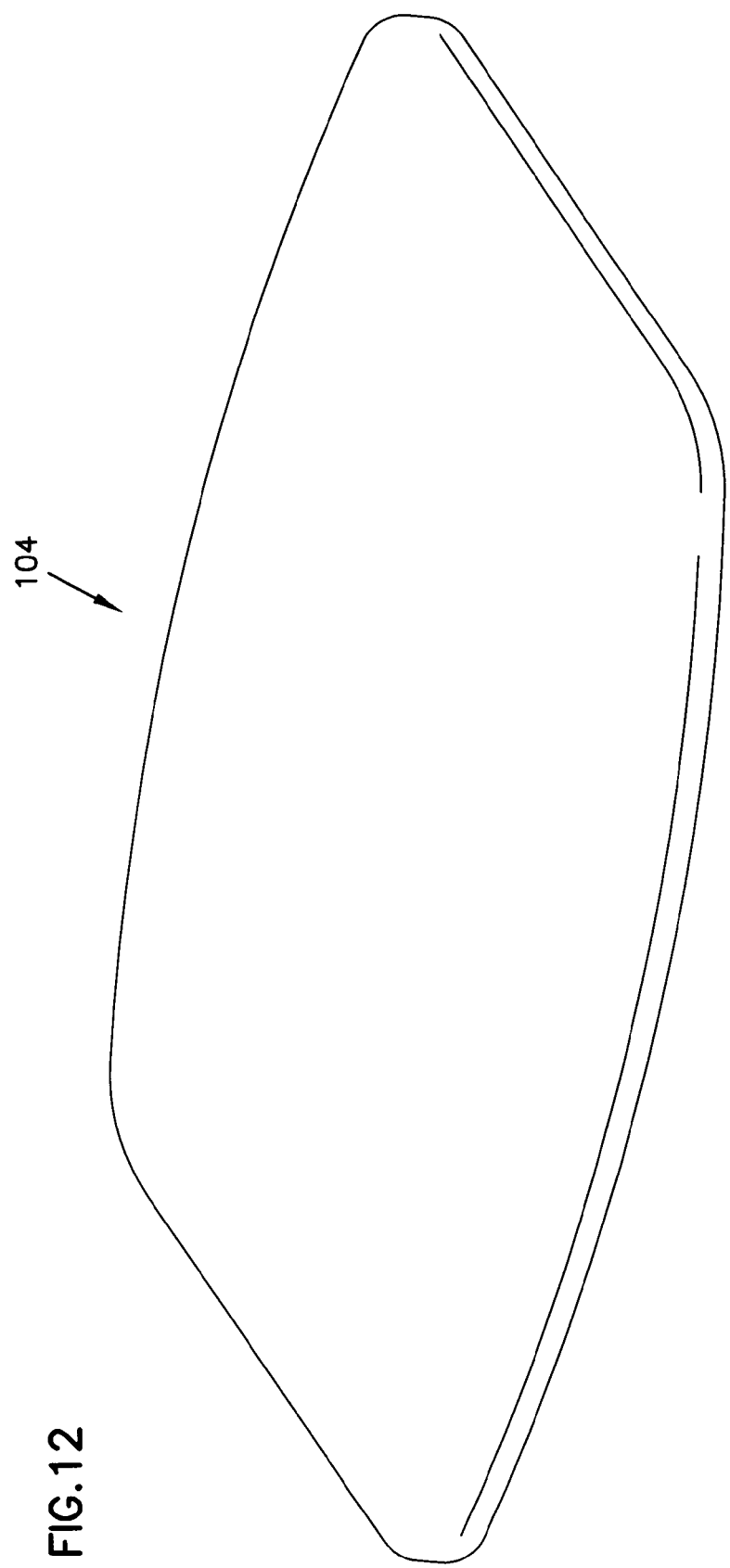
FIG. 12 is a perspective view of a cover for use with the portions of the bed bug monitor shown in FIGS. 10 and 11.
Figure 13:
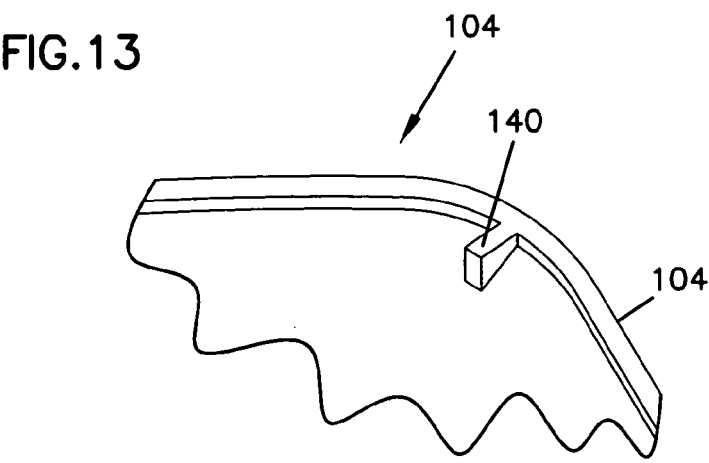
FIG. 13 is a perspective view of an underside corner of the cover of FIG. 12.
Figure 14:
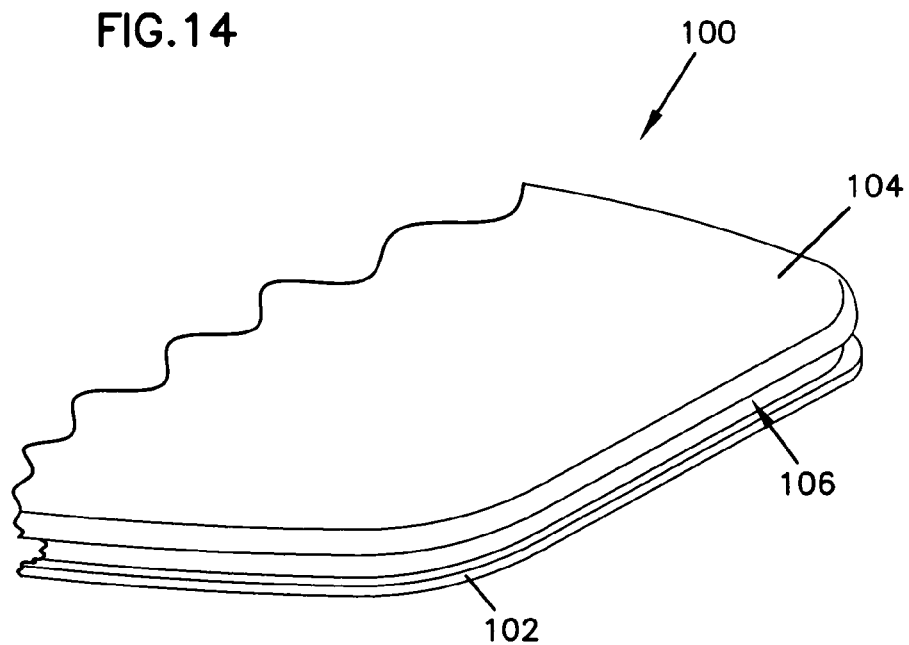
FIG. 14 is a partial, perspective view of a bed bug monitor.

A retention device that may be used in the receiving areas 72, 74 is a glueboard 154 including adhesive 156 on one surface as shown in FIG. 9. Any insects captured on the glueboard 156 within one of the receiving areas 72, 74 of the station 60 will not be visible because it is contained within the station 60. This configuration provides visual evidence of any insect presence, but reduces the likelihood that a customer or other casual observer of the trap will be able to see any captured insects.

Figure 8:
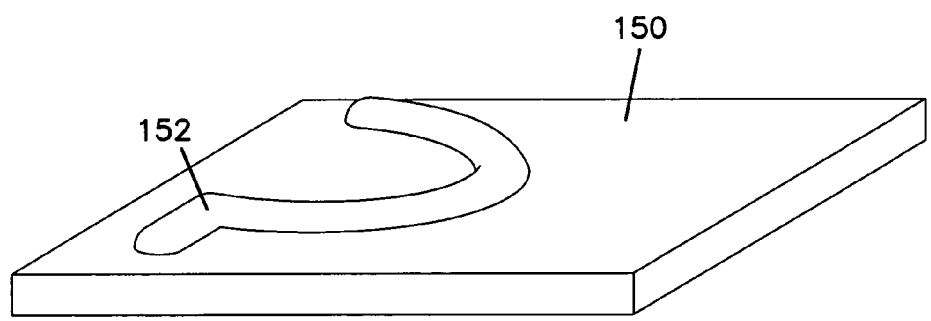
FIG. 8 is a perspective view of a pad of the present invention.

An example of a device that can be used in either the first receiving area 72, the second receiving area 74 or both receiving areas is shown in FIG. 8. The pad 150 may be a device for attracting, monitoring, trapping or baiting an insect, or it may accomplish any combination of these functions. For example, the pad 150 may be an insect sensor or a glueboard for trapping insects. Alternatively, the pad 150 may include a chemical attractant. The pad 150 may include a portion of insect bait 152. Examples of changeable pad materials include polystyrene, cardboard or absorbent materials.

Now referring to FIGS. 10-13, alternative embodiments of an insect monitoring and trapping device are shown at reference number 100. The insect monitoring and trapping device 100 includes a base 102 and a cover 104 that fit together and provide an insect opening 106 that allows insects to enter into the trap interior 108. The trap interior 108 can include an adhesive surface 110 and a heating device 112. The trap interior can additionally include a bait or attractant 114. The adhesive surface, the heating device, and the bait or attractant can be provided attached to the base 102 or the cover 104 or both.

The base 102 includes a peripheral wall 116. In general, the peripheral wall can include an exterior surface 118 that can be provided at an inclination that allows bugs to travel up the wall exterior surface 118. The wall exterior surface 118 can be textured to facilitate entry of the insects into the trap. The peripheral wall 116 can include a top edge 120 that can include a series of serrations 122. It should be understood that the presence of serrations is optional. It is expected that certain types of insects may prefer to climb through the serration valleys 124 rather than over a smooth surface. The peripheral wall 116 includes a wall interior surface 126. The wall interior surface can be provided as a canted surface 128. The characterization of the wall interior surface 126 as a canted surface 128 means that the wall extends at an angle of less than 90° from horizontal so that any insects traveling over the top edge 120 may fall directly into the trap interior 108 (wherein the angle is measured to provide a drop from the top edge 120 onto the bottom of the base 102). It should be understood that the wall interior surface 126 need not be provided as a canted surface 128. It is expected that by providing a canted surface 128, however, there may be advantages to trapping the insects. For example, if an insect is unwilling to step into an adhesive, providing the canted surface 128 may allow for enhanced trapping of insects if the insects fall into the adhesive located below the top edge 120. A trap containing a peripheral wall 116 having a canted surface 128 can be referred to as a pitfall trap.

The adhesive surface 110 can be provided so that it extends up to the peripheral wall 116. When the peripheral wall includes a wall interior surface 126 that is characterized as a canted surface 128, the adhesive surface can be provided below the top edge 120 so that insects falling over the top edge 120 contact the adhesive surface 110. The adhesive surface can be provided as an adhesive covering over the bottom surface of the base 102 or as a glueboard that attaches to the bottom surface of the base 102.

The heating device 112 can be provided as a chemical heating device 130 or as an electrical heating device 132. The heating device 112 can be constructed so that it provides a temperature sufficient to attract insects. In general, it is believed that certain insects are attracted to temperatures that are similar to human body temperatures. An exemplary temperature range that can be provided as a target temperature range is about 80° F. to about 100° F. as measured at the heating device surface. In the case of the chemical heating device 130, it is expected that the chemical heating device 130 can be activated and placed in the trap interior 108. The electrical heating device 132 can be provided as a device powered by an exterior source via the cord 134 or as a device powered by an interior source such as batteries provided within the compartment 136.

The electrical heating device 132 can be provided so that it provides an electrical discharge, on a periodic basis, so that any insect in contact with the electrical heating device 132 becomes electrocuted. The electrocution feature can be provided in addition to heating or, if desired, in place of heating.

The device 100 may or may not include a bait or attractant 114. If the device 100 includes a bait or attractant 114, the bait or attractant 114 can be provided at various locations. Two exemplary locations for the bait or attractant 114 include on the adhesive surface 110 and on the heating device 112. Exemplary baits or attractants include those effective for drawing insects, such as bed bugs, into the trap 100 and can include those baits and attractants identified above.

The cover 104 can include a stand off 140 that engages a slot 142 on the base 102. The engagement between the stand off 140 and the slot 142 allows the cover 104 to remain on the base 102 and provide for the insect opening 106.

The devices described herein are especially designed for monitoring a bed bug population. However, the same devices, structures and systems could be used to monitor and track other insect population. For example, the devices and systems described herein could be used to monitor cockroach, ant, beetle, or any other insect population. The above specification, examples and data provide a complete description of the manufacture and use of the composition of the invention. Since many embodiments of the invention can be made without departing from the spirit and scope of the invention, the invention resides in the claims hereinafter appended.

We claim:

1. A capacitive pest monitor apparatus, comprising:
    a) an interior and an exterior;
    b) a plurality of capacitive electrodes internally disposed in the apparatus;
    c) a capacitive sensing circuit, operatively connected to the capacitive electrodes, the capacitive sensing circuit detecting the capacitance of the electrodes and detecting changes in the capacitance due to pests passing over the capacitive electrodes and generating a pest detection signal;
    d) a pest detection signal storage device, the storage device operatively connected to the capacitive sensing circuit, the storage device receives the pest detection signals and stores the signals for later analysis; and
    e) a heating device internally disposed in the apparatus for attracting insects.

2. An apparatus according to claim 1, wherein the heating device comprises an electrical heating device.

3. An apparatus according to claim 1, wherein the heating device provides a surface temperature of about 80° F. to about 120° F.

4. An apparatus according to claim 1, further comprising a pheromone or attractant within the apparatus interior.

5. The apparatus of claim 1, wherein the capacitive sensing circuit monitors the capacitance of the capacitive electrodes continuously.

6. The apparatus of claim 1, wherein the capacitive electrodes run generally parallel to each other.

7. The apparatus of claim 1, wherein the capacitive electrodes extend completely around an area to be monitored.

8. The apparatus of claim 1, wherein the capacitive electrodes are interdigitized with one another.

9. The apparatus of claim 1, wherein the capacitive electrodes completely cover an area to be monitored.

10. The apparatus of claim 1, wherein the storage device is a non- volatile memory device; and further comprising:
    a) a real time clock device which is arranged and configured to keep time and to provide real time clock signals; and
    b) a processor, operatively connected to the real time clock device and between the storage device and the capacitive sensing circuit, the processor monitoring the capacitive sensing circuit and storing the pest detection signals together with real time clock signals in the non-volatile memory device, whereby the time a pest passes over the capacitive electrodes is preserved and the information is stored in close proximity to when the event occurred.

11. The apparatus of claim 1, further comprising a trapping element.

12. The apparatus of claim 1, wherein the storage device is a data logger device cooperatively connected to a relay block, wherein the relay block is triggered by the pest detection signal and the data logger device senses the triggering of the relay block and stores the event.

13. The apparatus of claim 1, wherein the data logger device is arranged and configured to maintain a time signal which can be combined with the stored event.

14. The apparatus of claim 1, further comprising sensors arranged and configured to accept additional manual input.

15. The apparatus of claim 1, wherein the manual input includes data on the condition of the pest monitor when it is inspected.

* * * * *

UNITED STATES PATENT AND TRADEMARK OFFICE
CERTIFICATE OF CORRECTION

PATENT NO. : 7,591,099 B2  Page 1 of 1
APPLICATION NO. : 11/511851
DATED : September 22, 2009
INVENTOR(S) : Lang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 32 days.

Signed and Sealed this

Twenty-first Day of September, 2010

David J. Kappos
*Director of the United States Patent and Trademark Office*